(12) United States Patent
Sadri et al.

(10) Patent No.: US 9,417,321 B2
(45) Date of Patent: Aug. 16, 2016

(54) MEASUREMENT OF CHARGE BANK LEVEL IN A METALLURGICAL FURNACE

(75) Inventors: Afshin Sadri, Mississauga (CA); Ehsan Shameli, Mississauga (CA); Roberto Venditti, Mississauga (CA); Andrei Kepes, Mississauga (CA); Terry Gerritsen, Mississauga (CA); Sean Southall, Mississauga (CA); Bruce Uyeda, Mississauga (CA)

(73) Assignee: Hatch Ltd., Mississauga (CA)

( * ) Notice: Subject to any disclaimer, the term of this patent is extended or adjusted under 35 U.S.C. 154(b) by 274 days.

(21) Appl. No.: 13/093,939

(22) Filed: Apr. 26, 2011

(65) Prior Publication Data

US 2011/0272866 A1    Nov. 10, 2011

Related U.S. Application Data

(60) Provisional application No. 61/328,023, filed on Apr. 26, 2010.

(51) Int. Cl.
| | | |
|---|---|---|
| *C22B 9/00* | (2006.01) | |
| *G01S 13/88* | (2006.01) | |
| *F27B 3/08* | (2006.01) | |
| *F27D 21/00* | (2006.01) | |
| *G01B 7/02* | (2006.01) | |
| *G01F 23/284* | (2006.01) | |
| *G01S 7/03* | (2006.01) | |
| *B22D 2/00* | (2006.01) | |

(52) U.S. Cl.
CPC ............... *G01S 13/88* (2013.01); *B22D 2/003* (2013.01); *F27B 3/085* (2013.01); *F27D 21/0028* (2013.01); *G01B 7/023* (2013.01); *G01F 23/284* (2013.01); *G01S 7/03* (2013.01)

(58) Field of Classification Search
CPC ..... F27D 21/0028; F27D 11/10; F27D 19/00; F27D 2021/0042; B22D 2/003; F27B 3/085; F27B 3/28; F27B 3/186; G01B 7/023; G01F 23/284; G01S 13/88; G01S 7/03; C21C 5/5211; G05F 1/66
USPC ...................... 266/78, 44, 92; 75/10.38, 10.41
See application file for complete search history.

(56) References Cited

U.S. PATENT DOCUMENTS

| | | |
|---|---|---|
| 4,044,353 A | 8/1977 | Levy |
| 4,094,494 A * | 6/1978 | Mahr .................. C21B 7/24 266/183 |
| 4,110,617 A | 8/1978 | Legille |
| 4,210,023 A | 7/1980 | Sakamoto et al. |

(Continued)

FOREIGN PATENT DOCUMENTS

| | | |
|---|---|---|
| CA | 2166027 A1 | 6/1996 |
| CN | 101492750 A | 7/2009 |

(Continued)

*Primary Examiner* — Scott Kastler
*Assistant Examiner* — Michael Aboagye
(74) *Attorney, Agent, or Firm* — Bereskin & Parr LLP/S.E.N.C.R.L., s.r.l.

(57) ABSTRACT

Various systems and methods for monitoring the level of a feed material layer in a metallurgical furnace are described. At least one non-contact sensor is used to sense a distance between the feed layer and a reference position. A process controller linked to the sensor provides a control signal based upon the sensed distance. The control signal may be used to control various factors in the operation of the metallurgical furnace.

35 Claims, 13 Drawing Sheets

(56) References Cited

U.S. PATENT DOCUMENTS

| | | | |
|---|---|---|---|
| 4,332,374 A | 6/1982 | Kremer | |
| 4,514,218 A | 4/1985 | Inagaki | |
| 4,737,791 A | 4/1988 | Jean et al. | |
| 5,043,735 A * | 8/1991 | Mawhinney et al. | 342/124 |
| 5,058,288 A | 10/1991 | Herzog et al. | |
| 5,105,874 A * | 4/1992 | Krausener et al. | 164/451 |
| 5,115,242 A | 5/1992 | Nagamune et al. | |
| 5,148,177 A | 9/1992 | Nagamune et al. | |
| 5,611,838 A * | 3/1997 | Fritz et al. | 75/10.38 |
| 5,629,706 A | 5/1997 | Baath | |
| 5,643,528 A | 7/1997 | Le Gras | |
| 5,783,805 A * | 7/1998 | Katzmann | 219/494 |
| 5,820,814 A * | 10/1998 | Doumet | 266/44 |
| 6,130,637 A | 10/2000 | Meszaros et al. | |
| 6,166,681 A | 12/2000 | Meszaros et al. | |
| 6,261,513 B1 * | 7/2001 | Bernard et al. | 266/92 |
| 6,911,929 B2 | 6/2005 | Laun | |
| 7,106,247 B2 | 9/2006 | Edvardsson et al. | |
| 2005/0133192 A1 | 6/2005 | Meszaros et al. | |
| 2009/0255375 A1 | 10/2009 | Reichel et al. | |
| 2010/0106341 A1 * | 4/2010 | Biermann et al. | 700/295 |
| 2011/0195111 A1 * | 8/2011 | Butters | G01N 37/005 424/450 |

FOREIGN PATENT DOCUMENTS

| | | | | |
|---|---|---|---|---|
| DE | 10207395 A1 | 9/2003 | | |
| EP | 444834 A2 | 9/1991 | | |
| EP | 1306451 A2 | 5/2003 | | |
| EP | 981034 B1 | 1/2004 | | |
| EP | 1510770 B1 | 7/2008 | | |
| EP | 1915889 B1 | 10/2008 | | |
| EP | 1937859 B1 | 6/2009 | | |
| GB | 2272593 A | 5/1994 | | |
| JP | 07-166222 | * | 6/1995 | F27D 2021/0042 |
| JP | 2003207382 A | 7/2003 | | |
| WO | 9418549 A1 | 8/1994 | | |
| WO | 0127338 A1 | 4/2001 | | |
| WO | WO 2008034701 | * | 3/2008 | H05B 7/20 |
| WO | 2010022703 A3 | 7/2010 | | |

* cited by examiner

MEASUREMENT OF CHARGE BANK LEVEL IN A METALLURGICAL FURNACE

CROSS REFERENCE TO RELATED APPLICATION

This application claims the benefit of U.S. Provisional application 61/328,023, filed on Apr. 26, 2010, which is incorporated herein by reference.

FIELD

The described embodiments relate to the measurement of a level of material contained in a metallurgical furnace and a related furnace control system.

BACKGROUND

Metallurgical furnaces are used to process feed material to separate metals and other materials in the feed materials to matte and slag. Various factors, including the rate at which feed material is introduced into a furnace, the rate at which matte and slag materials are drawn from the furnace, the operation of electrodes and control systems for melting equipment may be varied to control the process of converting feed material into matte and slag. It can be desirable to monitor amount of feed material in the metallurgical furnace to control some of these factors and other factors in the operation of a metallurgical furnace.

SUMMARY

In a first aspect, some embodiments of the invention provide a system for monitoring a level of a feed material layer contained in a metallurgical furnace including at least one non-contact sensor to sense a distance between the feed material layer and a reference position. The at least one sensor is positioned above the feed material layer. The system also includes a process controller communicably linked to the at least one sensor to output a control signal based on the sensed distance.

In some examples, the at least one sensor includes at least one transmitter positioned above the feed material. The sensor has an unobstructed line of sight to the feed material layer contained in the furnace. The at least one transmitter is configured to project an electromagnetic signal toward the feed material layer. The sensor also includes at least one receiver positioned to receive a reflection of the electromagnetic signal from a surface of the feed material layer. The sensor is operable to determine the sensed distance.

In some examples, at least one sensor is fixedly mounted relative to the furnace.

In some examples, the furnace comprises a plurality of feed ports and at least one sensor is positioned proximate to at least one of the plurality feed ports.

In some examples, the furnace comprises a plurality of electrode ports and at least one sensor is positioned proximate to at least one of the plurality of electrode ports.

In some examples, the at least one sensor comprises a plurality of sensors each generating at least one corresponding sensed distance and the process controller is configured to generate the control signal based on a plurality of sensed distances.

In some examples, the process controller is configured to process the plurality sensed distances to provide a surface topography of a surface of the feed material layer.

In some examples, the system also includes a display communicably linked to the controller to display at least one of any one of the plurality of sensed distances and the surface topography.

In some examples, the display is remote from the furnace.

In some examples, the process controller is configured to compare the surface topography to a pre-determined surface topography and to provide a surface output signal based on the comparison.

In some examples, the process controller is configured to output a plurality of control signals, each control signal being based on a corresponding one of the plurality of sensed distances.

In some examples, each sensor comprises a radar sensor.

In some examples, the system also includes a protective housing surrounding each sensor.

In some examples, each protective housing comprises a Faraday cage to provide electromagnetic shielding.

In some examples, the system also includes a thermal radiation shield between each sensor and the feed material layer to inhibit heat transfer between the sensor and the feed material layer.

In some examples, the thermal radiation shield is substantially transparent to the electromagnetic signal and the reflection.

In some examples, each sensor is position above a corresponding opening in a roof of the furnace, the opening providing the unobstructed line of sight to the feed material layer.

In some examples, the reference position is a known mounting location of the sensor.

In some examples, the controller is operable generate the control signal in real-time.

In some examples, the process controller is communicably linked to a feed actuator and is configured to generate a feed control signal to automatically regulate a feed rate of the feed material based on feed control signal.

In some examples, the process controller is communicably linked to an electrode actuator and is configured to generate an electrode control signal to automatically move an electrode from a first position to a second position based on the electrode control signal.

In some examples, the process controller is communicably linked to an electrode power supply regulator and is configured to generate an electrode control signal to automatically regulate the power supplied to an electrode based on the electrode control signal.

In some examples, the at least one sensor is moveably supported to enable the at least one sensor to sense a first sensed distance when the sensor is in a first position and to sense a second sensed distance when the sensor is in a second position.

In some examples, the at least one sensor is operable to sense a plurality of sensed distances corresponding to a plurality of locations on a surface of the feed material layer.

In some examples, the process controller is configured to receive and process data from at least one thermal sensor.

In some examples, the at least one sensor is positionable to sense a second sensed distance between a second material layer and the reference position.

In some examples, the at least one sensor includes a first sensor positioned for sensing the sensed distance and a second sensor positioned to sense a second sensed distance between a second material layer and the reference position.

In some examples, the at least one receiver comprises at least two receivers and the at least one transmitter is communicably linked to each of the at least two receivers.

According to a second aspect, some embodiments of the invention provide a method of monitoring a feed material layer in a metallurgical furnace including the steps of a) providing at least one non-contact sensor positioned above the feed material layer contained in the furnace while the furnace is in use; b) sensing a sensed distance between a surface of the feed material layer and a reference position using the sensor; c) providing a process controller communicably linked to the sensor to generate a control signal based on the sensed distance; and d) outputting the control signal.

In some examples, step a) comprises providing at least one transmitter in a fixed position above the feed material layer and providing at least one receiver above the feed material layer; and step b) comprises projecting an electromagnetic signal from the transmitter toward a surface of the feed material layer, collecting a reflection of the electromagnetic signal off a surface of the feed material layer using the receiver and comparing the electromagnetic signal to the reflection.

In some examples, the method also includes the step of using the process controller to control at least one of a feed material supply rate, an electrode position and an electrode power supply based on the control signal.

In some examples, the step of controlling at least one of the feed material supply rate, the electrode position and the electrode power supply based on the control signal is carried out automatically by the process controller without user intervention.

In some examples, at least the steps of comparing the electromagnetic signal to the reflection and outputting the control signal are preformed by the controller in real-time.

In some examples, the method also includes the step of providing a display and generating a display output based on the control signal.

In some examples, step a) comprises providing a plurality of transmitters above the feed material layer, step b) comprises providing a corresponding plurality of receivers above the feed material layer, and determining one sensed distance corresponding to each transmitter.

In some examples, step c) comprises providing a plurality of control signals, each control signal based on one sensed distance.

In some examples, step c) comprises generating a surface topography based on the plurality of sensed distances and generating a surface control signal based on the surface topography.

In some examples, the surface is an upper surface of a feed material layer contained in the furnace.

In some examples, the method also includes the step of positioning the at least one sensor in a second position to sense a second sensed distance between a second location on the surface and the reference position.

In some examples, the method also includes the step of positioning the at least one sensor in a second position to sense a second sensed distance between a second material layer and the reference position.

According to a third aspect, some embodiments of the present invention provide a feed control system for a metallurgical furnace containing a feed material layer, the feed control system includes at least one non-contact sensor to sense a distance between a surface of the feed material layer and a reference position. The sensor is positioned above the feed material layer. The system also includes a process controller communicably linked to the at least one sensor and configured to output a control signal based on the distance. The system also includes at least one feed supply actuator communicably linked to the controller to automatically regulate a flow of feed material into the furnace based on the control signal.

In some examples, the at least one sensor includes at least one transmitter fixedly positioned above the feed material layer and having an unobstructed line of sight to the feed material layer. The at least one transmitter is configured to project an electromagnetic signal toward the feed material layer. The sensor also includes at least one receiver fixedly positioned to receive a reflection of the electromagnetic signal from a surface of the feed material layer.

According to a fourth aspect, some embodiments of the present invention provide a metallurgical furnace including a reactor vessel for containing a feed material layer and at least one non-contact sensor mounted to the reactor vessel. The sensor is positioned to have an unobstructed line of sight to the feed material layer contained in the furnace. The sensor is operable to sense a sensed distance between a surface of the feed material layer and the sensor.

In some examples, the furnace also includes a process controller communicably linked to the at least one sensor. The process controller is operable to generate and output a control signal based on the sensed distance.

In some examples, the furnace also includes at least one feed port and at least one feed supply actuator to regulate a flow of feed material through the at least one feed port. The at least one feed supply actuator is communicably linked to the process controller to automatically regulate a flow of feed material into the furnace based on the control signal.

In some examples, the furnace also includes at least one electrode movably received within a corresponding electrode port and at least one electrode actuator operable to translate the electrode relative to the reactor vessel. Each electrode actuator is communicably linked to the process controller to translate the at least one electrode based on the control signal.

According to a fifth aspect, some embodiments of the present invention provide a system for monitoring a level of a material layer contained in a metallurgical furnace including at least one non-contact sensor to sense a distance between the material layer and a reference position. The at least one sensor is positioned above the material layer. The system also includes a process controller communicably linked to the at least one sensor to output a control signal based on the sensed distance.

According to a sixth aspect, some embodiments of the present invention provide a method of controlling a feed rate at which feed material is supplied to a metallurgical furnace. The method includes the steps of: a) obtaining a charge bank level; b) obtaining a slag level; c) comparing the charge bank level and the slag level to determine a charge bank height; d) comparing the charge bank height to a plurality of pre-determined acceptable height values; and e) adjusting at least one of the feed rate and an electrode power based on the comparison of step d).

BRIEF DESCRIPTION OF THE DRAWINGS

A preferred embodiment of the present invention will now be described in detail with reference to the drawings, in which.

Figure 1:
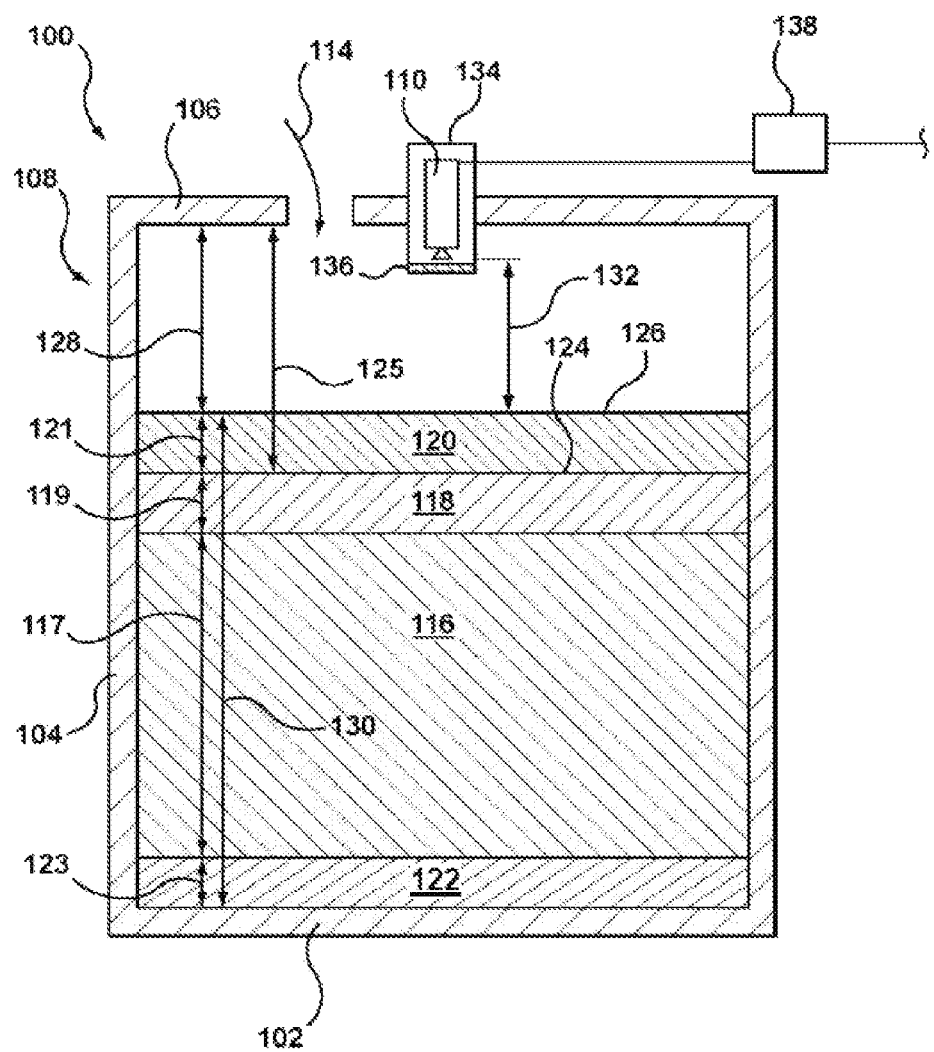
FIG. 1 is a schematic representation of an example of a metallurgical furnace.

For simplicity and clarity of illustration, elements shown in the figures have not been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

Various apparatuses or processes will be described below to provide example of embodiments of each claimed invention. The described embodiments do not limit any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Reference is first made to FIG. 1, which is a schematic representation of a metallurgical furnace, for example furnace 100, having a bottom surface, at least one side surface and a top surface that cooperate to define a furnace or reactor vessel 108 to contain material being melted in the furnace. The furnace 100 includes a sensor 110 that is used to determine the position or level of the material in the furnace, relative to the sensor 110. Based on the level of the material in the furnace, one or more operating parameters of the furnace can be modified, including, for example the rate at which additional material is introduced into the reactor vessel and the rate at which material is drawn from the reactor vessel. Optionally, the sensor 110 can be communicably connected to any suitable instruments, actuators and controllers so that the operating parameters can be automatically adjusted based on the level of the material, without requiring intervention or input from a human operator.

In the examples described herein, the sensors 110 are permanently or fixedly connected to furnace 100 in their operating positions so that the sensors 110 can conduct ongoing measurements while the furnace is in use, as opposed to being only temporarily positioned over the furnace for a one-time measurement. Accordingly, the sensors 110 are configured to withstand the expected operating conditions of the furnace. While any given sensor may be moveable or positionable relative to the furnace 100 (i.e. pivotable, rotatable, translatable), the sensors 110 are fixedly connected to the furnace so that the sensors remain in their operating position while the furnace is in use. It is understood that even permanently mounted sensors can be temporarily removed or detached for inspection, maintenance and replacement.

In FIG. 1, the bottom surface of the reactor 100 is provided by hearth 102, the side surface is provided by the sidewalls 104 and the top surface is provided by the reactor roof 106. Together, these elements define the reactor vessel 108. The reactor roof 106 includes at least one feed port 112 through which material to be melted, or feed material, can be introduced into the reactor vessel 108. The flow or supply of feed material into the reactor vessel 108 is represented schematically in the Figures by the plurality of arrows 114. The feed material can be any suitable material to be melted in the furnace 100, including for example, ore, metal and the like.

When the furnace 100 is in use, the feed material melts to form a generally molten fluid or slurry that can include a variety of different components. It is understood that relative differences in the density of such components can result in a predictable stratification or layering of the material in the reactor vessel 108. In the illustrated example, the material in the reactor vessel 108 contains a layer of molten product material, that is the desired end product of the smelting operation. Depending on the nature of the feed material supplied to the furnace 100, the molten product material is commonly referred to as being a metal phase or a matte phase. It is understood that the sensors and control systems described can be used on furnaces that contain either a molten metal phase or a molten matte phase. For simplicity, the examples described herein refer to a molten matte phase that forms a matte layer 116, but it is understood that alternatively a molten metal phase could be present in any of the examples described herein. The matte layer 116 defines a measurable, matte layer depth or thickness 117.

Floating above the matte layer 116 is a slag layer 118. The slag layer 118 is formed from material defining a slag phase, that can include a combination of impurities, lighter molten elements (possibly comprising different metal compositions) and other by-products produced when the feed material is melted. In some examples, the slag layer 118 contains generally unwanted or undesirable compounds and is withdrawn from the reaction vessel 108 separately from the matte phase. The slag layer 118 defines a slag layer depth 119.

Over time, in some embodiments, portions of the matte phase in matte layer 116 can solidify, or freeze, and form solid matte particles that are denser than the matte phase, and therefore tend to settle to the bottom of the vessel 108. Such solid matte particles can collect at the bottom of the vessel 108 and may form a build-layer 122, having a build-up layer depth 123.

While the interfaces between each of these levels is schematically illustrated as a straight line for convenience and clarity, it is understood that such interfaces may not be defined by a single, flat plane, but instead may vary across the surface of the vessel 108 and can define interface sub-layers that include a mixture of adjacent phases (for example a mixture of slag and matte phases between slag layer 118 and matte layer 116). These interface sub-layers typically have a measurable thickness.

When the furnace 100 is in use, incoming feed material 114 can be added to a reaction vessel 108 that already contains a combination of molten matte material and slag material. As the feed material is exposed to the operating temperatures of the furnace, for example in some furnaces that temperature can be between 1500-1700 degrees Celsius, the feed material can be consumed to produce additional matte and slag material. If the rate at which feed material is introduced into the reactor vessel 108 exceeds the rate at which feed material contained in the reactor vessel 108 is consumed (i.e. transformed into matte and slag material) a layer of feed material, illustrated schematically as feed material layer 120, can accumulate in an unmelted condition above the slag layer 118. The accumulated feed material layer is also described as a charge bank 120, and the distance between the feed material-slag phase interface, or feed/slag interface 124 and the upper or exposed surface of the feed material layer 126 defines a feed material layer depth or charge bank height 121. The distance between the feed/slag interface 124 and the furnace roof 106 (or other reference position that is used to determine the charge bank level 128, described below) defines a slag level 125.

The distance between the upper surface 126 of the charge bank 120 and a pre-determined point or reference point on the reactor 100, for example a point on the roof 106, defines a charge bank level 128, also referred to herein as a freeboard height.

To determine the level or total depth 130 of material contained in the reactor vessel 108 and/or the charge bank level 128, a sensor 110 can be positioned above the material in the furnace 100 to measure or sense a distance between the upper surface 126 of the charge bank 120 and the sensor 110, represented in FIG. 1 as sensed distance 132.

In some examples, the charge bank level 128 can be calculated based on the sensed distance 132. For example, the sensor 110 can be mounted to the roof 106 in a known location so that the position of the sensor 110 relative to the walls of the reactor vessel 108 is known. In this example, the charge bank level 128 can be calculated by comparing or combining the sensed distance 132 with the known position of the sensor 110 relative to the vessel 108. Optionally, the sensors 110 can be position so that the sensed distance 132 is greater than or less than the charge bank level 128, see FIG. 3.

Figure 2:
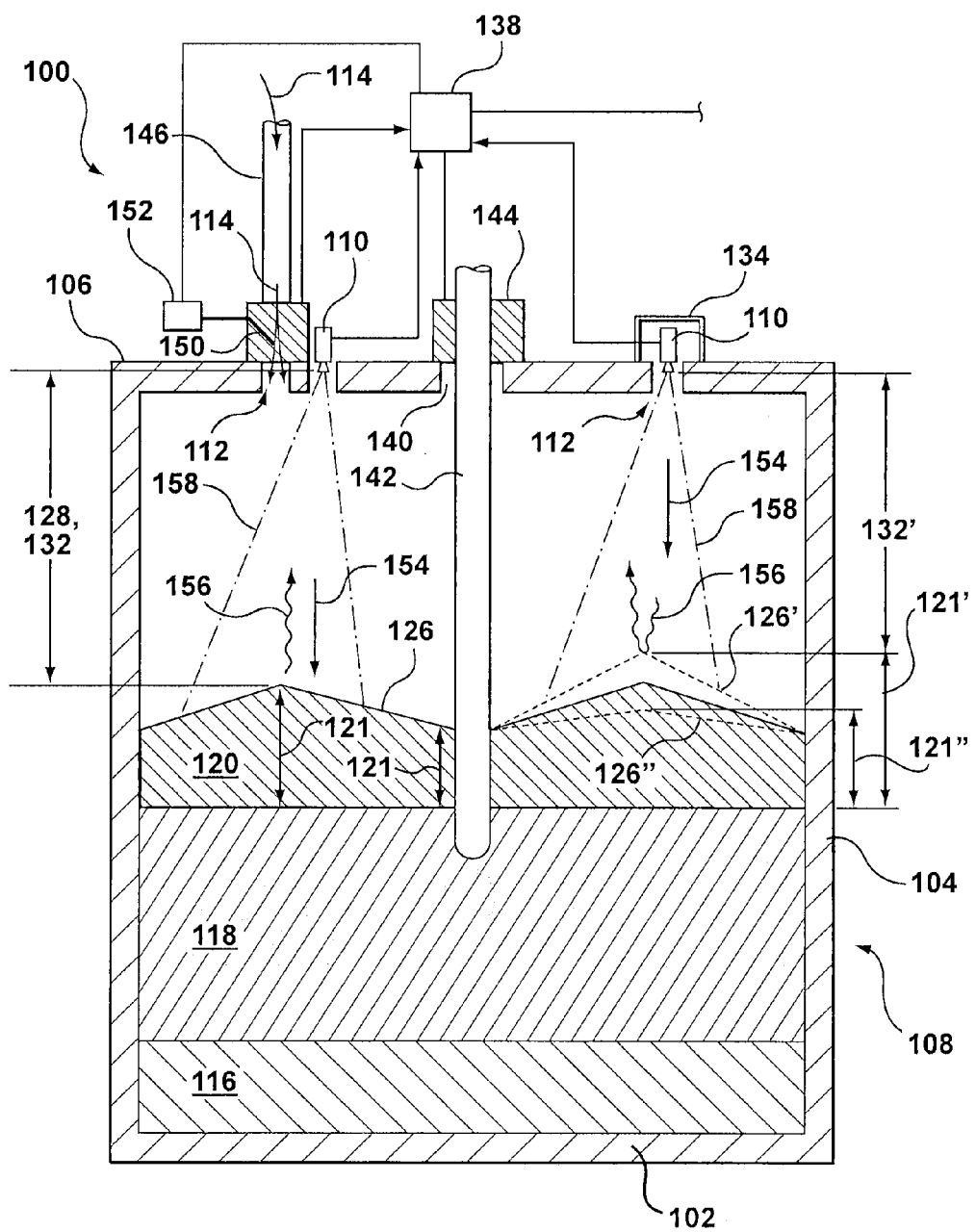
FIG. 2 is a schematic representation of another example of a metallurgical furnace.

In other examples, as exemplified in FIG. 2, the sensor 110 can be positioned at one of the reference points of the furnace 100, so that the sensed distance 132 coincides with the charge bank level 128, so that additional calculations may not be necessary to determine the charge bank level 128.

The sensor 110 is communicably linked to a controller, for example process controller 138. The link between the sensor 110 and process controller 138 can be a one-way link (allowing data to be sent from the sensor 110 to the process controller 138) or a two-way link (allowing data to be sent from the sensor 110 to the process controller 138 and from the process controller 138 to the sensor 110). Optionally the process controller 138 can be configured to control the operation of the sensor 110 and receive information, including the sensed distance 132, from the sensor 110. The process controller 138 can then generate one or more output or control signals that can be used to provide user feedback so that an operator can take an appropriate action (i.e. as an open-loop control system) or automatically control one or more other aspects or operating parameters of the reactor, as explained in detail below (i.e. as a closed-loop control system). The process controller 138 can be connected to the sensor 110 using any suitable cable or connector that can withstand the expected operating conditions of the furnace 100.

Referring to FIG. 2, an example of a furnace 100, an electric arc furnace, includes a reactor vessel 108 containing a matte layer 116, a slag layer 118 and a charge bank 120. The roof 106 of the furnace 100 includes a pair of feed ports 112 for receiving a supply of feed material 114 and an electrode port 140 for receiving a corresponding electrode 142. The electrode 142 can be any suitable electrode known in the art, and can be movably received within the electrode port 140 so that the vertical position of the electrode 142 can be adjusted, for example based on the amount of material in the reactor vessel 108, using any suitable electrode actuator, schematically represented as electrode actuator module 144.

Each feed port 112 can be supplied with feed material using any suitable feed material conduit, for example conduit 146, known in the art. In the illustrated example, the feed material conduit 146 includes a feed supply regulator for controlling or regulating the flow of feed material into the reactor vessel 108. As schematically illustrated in FIG. 2, one example of a feed supply regulator includes a feed gate 150 that is driven by gate actuator 152 that is used to physically constrict, and optionally completely block, feed conduit 146.

As feed material is added through feed ports 112, it may tend to accumulate beneath the feed ports 112 and then disperse to the other portions of the reactor vessel 108 as additional feed material is added. In FIG. 2, the upper surface 126 of the charge bank 120 is illustrated as having a sloping or generally cone or pyramid like shape, having a thickness or charge bank height 121 below the feed port 112 that is greater than the charge bank height 121 at other locations, for example proximate the electrode 142 as illustrated.

In the illustrated example, the charge bank 120 is shown as having a desired charge bank height 121. In this state the upper surface 126 is shown as being in a desired position relative to the top of the slag layer 118, the feed/slag interface 124. Illustrated using dashed lines on the right side of FIG. 2, upper surface 126' represents an over fed condition (in which the charge bank 120 has built up to an undesired height 121' as a result of feed material being fed into the furnace 100 faster than it can be consumed). As the feed material continues to accumulate, the surface 126' can rise above a desired operating position within the reactor vessel 108, which results in a sensed distance 132' that is less than a desired charge bank level 128. In some furnaces, a charge bank having an increased charge bank height 121 acts as a thermal insulator that reduces the heat transfer from the slag and matte phases into the freeboard region (the region between the charge bank surface 126 and the furnace roof). This decrease in heat transfer can result in overheating of the material in the furnace, which may lead to crusting of the charge bank surface 126 and may reduce smelting efficiency. As explained in greater detail below, the process controller 138 can be linked to both the sensors 110 and the gate actuator 152, so that when the sensors 110 detect an over fed condition, i.e. when the charge bank height 121 has increased beyond a pre-determined threshold, the flow of feed material into the furnace can be automatically restricted, without requiring operator input.

Also in FIG. 2, upper surface 126" represents an under fed condition (in which the charge bank height 121 has decreased to an undesired height as a result of feed material being fed into the furnace 100 more slowly than it can be consumed). A thinner than desired charge bank height 121, as occurs when the reactor is under fed, can result in hot spots on the furnace roof 106 and reduced smelting efficiency as a result of higher than expected heat loss (due to the absence of the insulating effect of the charge bank 120). In this example a sensed distance between the sensor 110 and the upper surface 126″ would exceed the desired or expected distance 132.

In addition to variations in the feed rate, the position of surface 126 relative to the sensor 110, i.e. the sensed distance 132, can vary based on other furnace operations. For example, the distance between surface 126 and the sensor 110 may increase (i.e. the charge bank level 128 can increase) when the furnace is being tapped because the overall quantity of material in the furnace is reduced. In other instances, the charge bank level 128 can decrease (i.e. the surface 126 can move toward the sensor 110) if the furnace is over filled. If the surface 126 reaches a pre-determined location within the furnace, for example within 1 m of the roof 106, the sensed distance 132 may decrease below a pre-determined alarm threshold condition and the process controller 138 can generate an alarm condition and/or a control signal based on the alarm condition. Optionally, the process controller 138 can be configured to automatically shut down the furnace.

In either example, when the actual sensed distance 132 differs from an expected or desired distance 128, or if the charge bank height 121 differs from a desired range of heights, the process controller 138 can be operable to control the gate actuator 152 to automatically adjust the feed material supply rate in an appropriate manner, for example increasing the supply rate when the reactor 100 is under fed, and decreasing the supply rate when the reactor 100 is over fed or is approaching or past an alarm threshold.

Referring to FIGS. 2, 6, 7 and 8, one example of a sensor 110 that is suitable for use in combination with the furnace 100 is a radar sensor 110 that emits and receives electromagnetic signals. Radar sensors, and the operating principles of existing radar sensors are known in the art and will be only briefly explained below.

When configured as a radar sensor 110, each sensor 110 includes at least one transmitter portion for generating and projecting an electromagnetic signal (for example a microwave pulse or a continuous microwave signal) and at least one corresponding receiver portion for receiving incoming electromagnetic signals.

Outgoing electromagnetic signals (or EM signals) generated by the sensors 110 are projected toward the material in the reactor 100, for example toward upper surface 126. The signals travel at a known rate and have other known properties (including signal frequency and signal magnitude). In the present examples, outgoing electromagnetic signals are illustrated using a plurality of arrows 154. When the outgoing EM signals 154 contact an opposing object, such as upper surface 126, at least a portion of the outgoing signals 154 is reflected off the upper surface 126 and forms an incoming or reflected EM signal, illustrated herein using a plurality of wavy arrows 156. The magnitude or emission power of the EM signals 154 can be selected based on a variety of factors, including, for example, plant operating conditions and applicable safety regulations.

Referring to FIG. 2, each sensor 110 can project an outgoing EM signal 154 toward a portion of the charge bank 120 that underlies the sensors 110. The information received from each sensor 110 is relayed to a suitable controller in the furnace control system, for example process controller 138, where it can be compared to predetermined furnace operating parameters, including for example, acceptable charge bank heights, charge bank level alarm threshold conditions, desired or optimal sensed distances, a range of acceptable sensed distances, and one or more alarm criteria that are stored in a system memory or database. Based on the results of the comparison (or query), the process controller 138 can generate one or more appropriate output or control signals.

Optionally, the sensors 110 can be configured to emit EM signals in a generally conical pattern, represented by dashed lines 158, that increases in diameter as it approaches the charge bank 120. Projecting EM signals in this manner can allow each sensor 110 to determine the position of upper surface 126 across a larger area (i.e. across a larger proportion of the total surface area of the material held in the vessel 108). Sensing distances across a larger area may allow the sensor 110 to measure multiple distances 132 for the portion of the surface 126 within the conical projection 158. After collecting each distance 132, the process controller 138 can optionally be configured to calculate the average of all of the distances 132 and/or determine a plurality of separate sensed distance 132 values (for example a maximum and a minimum sensed distance 132 within a given measurement area).

By comparing the distances 132 with the position of the feed/slag interface 124, the process controller 138 can determine a plurality of charge bank heights 121, including a maximum height, a minimum height and an average height. The process controller 138 can generate a control signal based on the minimum, maximum and average distance 132, the minimum, maximum and average charge bank height 121 or any combination or sub-combination thereof.

Figure 6:
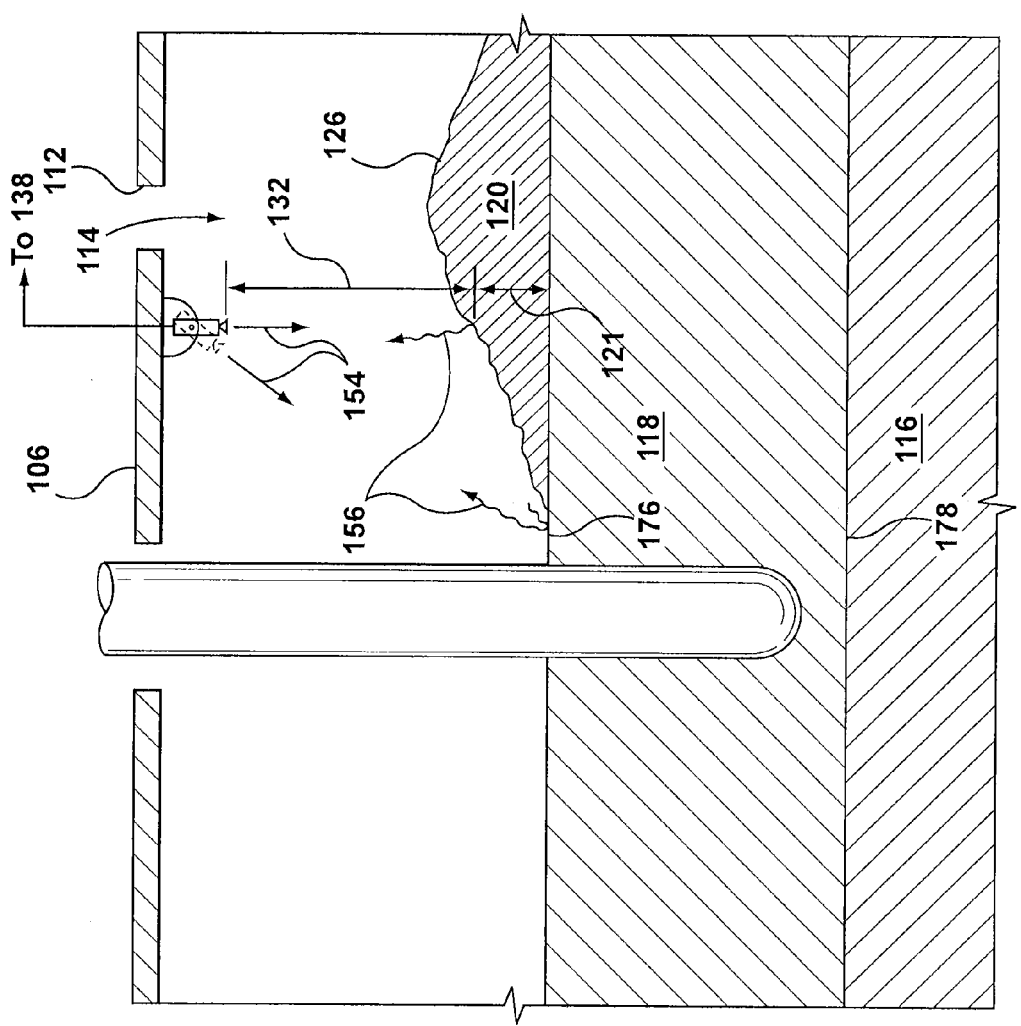
FIG. 6 is a schematic representation of an example of a metallurgical furnace.

Referring to FIG. 6, in some examples of the furnace 100, a sensor 110 can be movably mounted to the furnace 100, for example to furnace roof 106, using any suitable moveable mounting apparatus, including for example, a gimbal 158. Using a gimbal 158, the sensor 110 can be pivoted and/or rotated relative to the furnace 100, allowing each sensor 110 to take multiple measurements at multiple locations. In some examples the gimbal can be controllable by any suitable controller, for example the process controller 138, and can be programmed to sweep the sensor 110 in a pre-determined (or possibly random or pseudo-random) pattern to measure and record a plurality of sensed distances 132 at different locations on the upper surface 126 of the charge bank 126. As described above, the plurality of sensed distances 132 recorded using the moveable sensor 110 can be processed to obtain a variety of different information regarding the contours or topography of the upper surface 126 (e.g. average charge bank height 121, max or minimum charge bank height, etc.).

In some instances, the rate of feed material consumption in the furnace 100 increases in the portions of the charge bank 120 that surround the electrode(s) 142 in the furnace 100. In such instances, the charge bank height 121 proximate the electrodes 142 can be smaller than the charge bank height 121 at other locations within the furnace 100.

In some examples, as illustrated in FIG. 6, the feed material surrounding the electrodes 142 can be completely consumed, creating a feed bank height of zero, while other locations in the vessel 108 can still have an accumulation of feed material providing a measurable charge bank 120. Where the feed material has been completely consumed, the upper surface 176 of the slag layer 118 can be exposed to the freeboard and can be within the line of sight of the sensor 110.

In these examples, the sensor 110 can be used to determine the charge bank height by measuring the position of the upper surface 126 of the charge bank 120, and to determine the level of the slag layer 118 by measuring the distance between the exposed surface 176 of the slag layer 118 and the sensor 110 (or other reference position). The measurements of both the upper surface 126 and slag upper surface 176 can be sent to the process controller 138 for further processing as described herein.

Figure 3:
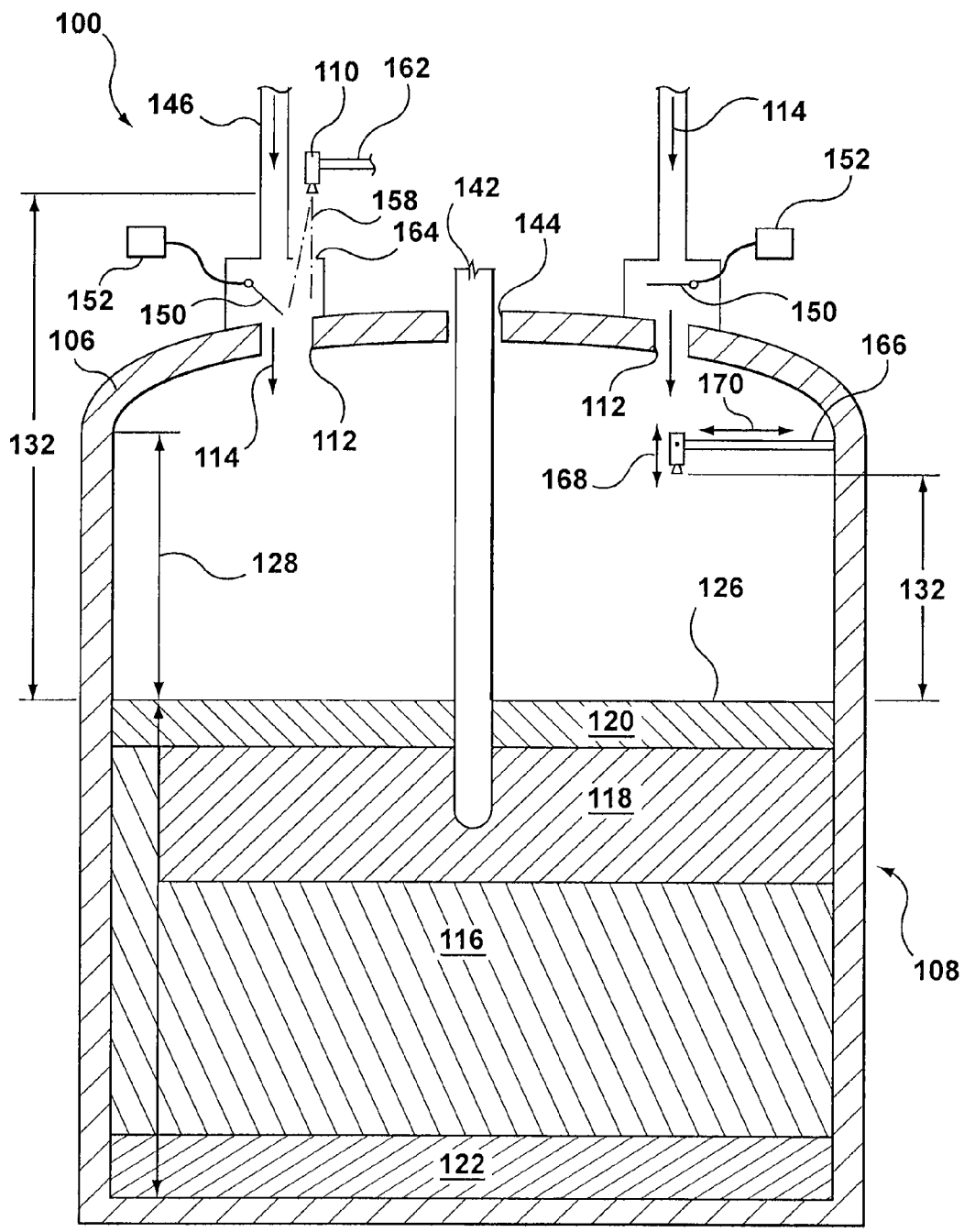
FIG. 3 is a schematic representation of another example of a metallurgical furnace.

Referring to FIG. 3, a furnace 100 is illustrated showing examples of possible sensor 110 mounting locations. As illustrated on the left side of FIG. 3, a sensor 110 can be mounted above the furnace, for example above roof 106, and need not be directly coupled to any portion of the furnace 100. In this example, the sensor 110 can be mounted on an external support bracket 162 that extends from, and/or is coupled to, an external support structure that is located adjacent the furnace 100, for example a ceiling of a building or other furnace enclosure, or a freestanding support structure.

The sensor 110 can be positioned in any desired location above the roof 106, and at any height above the roof 106 provided that the sensor 110 is aligned with a corresponding hole or aperture 164 in the roof 106 or other furnace fixture (in this case the aperture is shown as being formed in a portion of the feed supply conduit 142, optionally in a the portion of the conduit 142 that houses the feed gate 150). Aligning the sensor 110 with an aperture 164 in the furnace 100 ensures that the sensor 110 has an unobstructed line of sight to the material contained in the furnace 100, for example the charge bank 120. Providing an unobstructed line of sight means that the path between the sensor 110 and material in the furnace 100 (i.e. the charge bank 120) is substantially free from obstacles or objects that would materially interfere with the desired operation of the sensor 110.

The sensor 110 mounted above the furnace 100 can be moveably mounted, for example using a gimbal as described herein, to record distance measurements at multiple locations on the upper surface 126. Alternatively, or in addition, the sensor 110 can be movable between a plurality of positions that correspond to a plurality of apertures 164 in the furnace 100, enabling the sensor 110 to take distance measurements through each of the plurality of apertures 164. Sensors 110 mounted above the furnace 100 will measure a sensed distance 132 that is greater than the charge bank level 128. To determine the charge bank level 128, the sensed distance 132 can be compared to the known configuration of the furnace 100, including the relative distance between the sensor 110 and the roof 106 or other reference position.

Referring to the right side of FIG. 3, a sensor 110 positioned within the internal volume or interior of the reactor vessel 108 and is supported using an internal support bracket 166. The sensor 110 can be movably mounted to the internal support bracket 116 using a gimbal as described herein or any other suitable apparatus that allows pivoting and or rotation of the sensor relative to the internal support bracket 166. Alternatively, or in addition, the internal support bracket 166 can be moveably mounted to the vessel 108, for example on a rail or track system (not shown) so that the internal support bracket 166 can translate vertically, as indicated by arrows 168, and horizontally (i.e. into the page as viewed in FIG. 3). The internal support bracket 166 can also be configured to extend and contract, for example by telescoping, as illustrated by arrows 170.

In examples where the physical location of the sensor 110 and internal support bracket 166 can change (as opposed to simply pivoting or rotating in place) either the sensor 110, process controller or other suitable module can be configured to automatically account for the physical location of the sensor 110 relative to the vessel 108 when determining the sensed distance 132. For example by comparing the vertical position of the internal support bracket 166 to the known reference position to determine a baseline position and then comparing the sensed distance 132 to the baseline position to determine the charge bank level 128 relative to the reference position.

Figure 4:
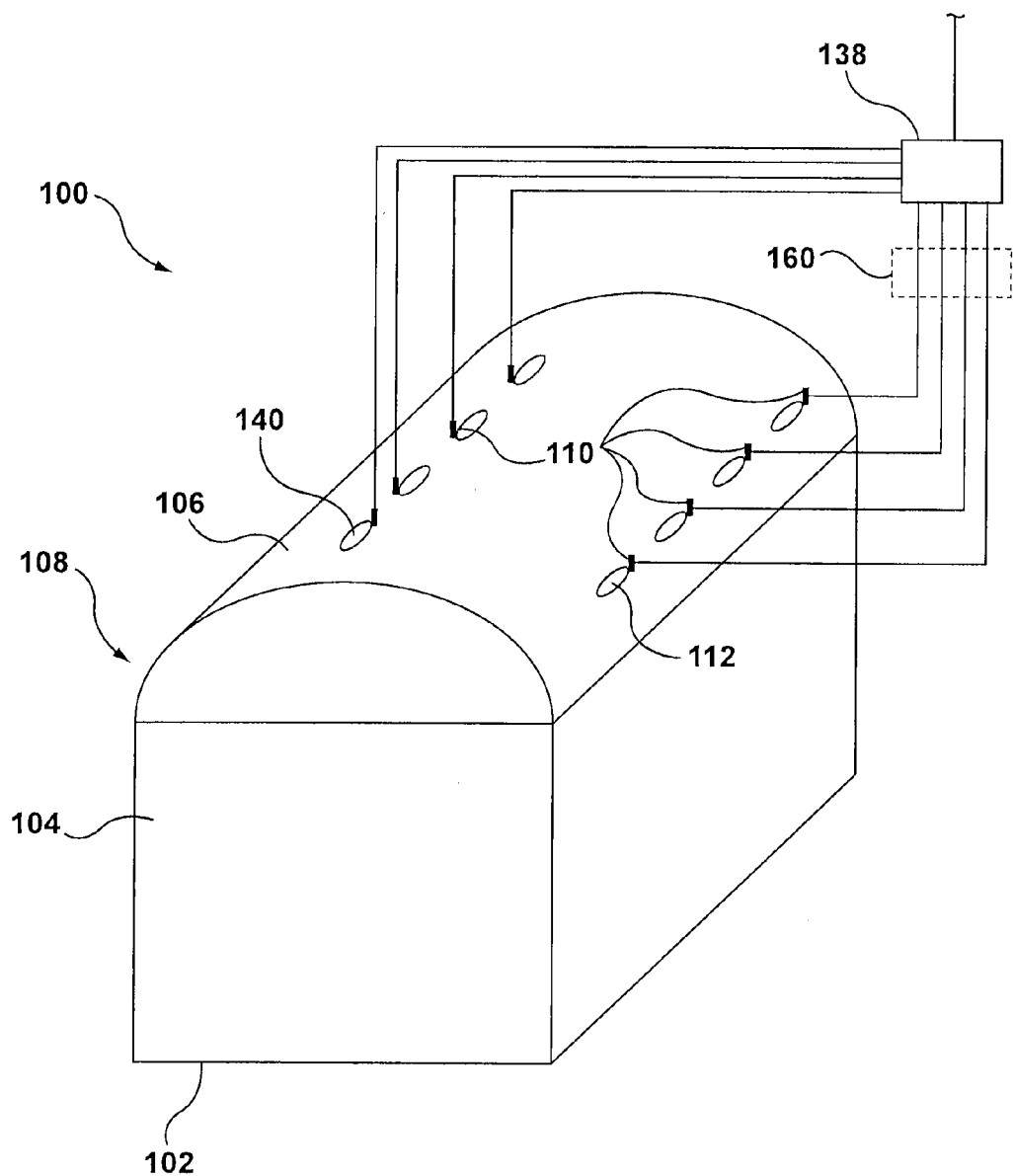
FIG. 4 is an isometric view of an example of a metallurgical furnace.

Alternatively, or in addition, the sensed distances from a plurality of sensors 110 (either fixed or moveable sensors) can be compiled or composited by any suitable computer or controller, for example process controller 138, to provide information regarding the overall topography of substantially the entire upper surface 126 (or at least the portions of the upper surface 126 that can be measured by one or more sensor 110). FIG. 4 illustrates an example of a furnace 100 having a plurality of sensors 110 mounted on the furnace roof 106. In this example, a sensor 110 is provided proximate each feed port 112, to monitor the charge bank height beneath each feed port 112, and a second plurality of sensors 110 position proximate each electrode port 140, to monitor the charge bank height around each electrode that extends into the furnace 100.

Each of the sensors 110 in this example can be connected to a single process controller 138 that can receive and process the signals from each sensor 110. Alternatively, or in addition, one or more sub-controllers 160 (illustrated using dashed lines) can be provided to collect the data from a portion of the sensors 110, for example the plurality of sensors proximate the feed ports 112, and then relay the collected information, or an output signal based on the collected information, to the primary process controller 138. While illustrated to include four feed ports 112 and four electrode ports 140, it is understood that the furnace 100 of FIG. 4 could have any desired number of feed ports 112 and electrode ports 140 (if necessary). It is also understood that additional sensors 110 can be placed at additional locations throughout the furnace 100 if desired, or a greater or fewer number of sensors 110 could be used (so that there is not a 1:1, port 112, 140 to sensor 110 ratio.

Figure 7:
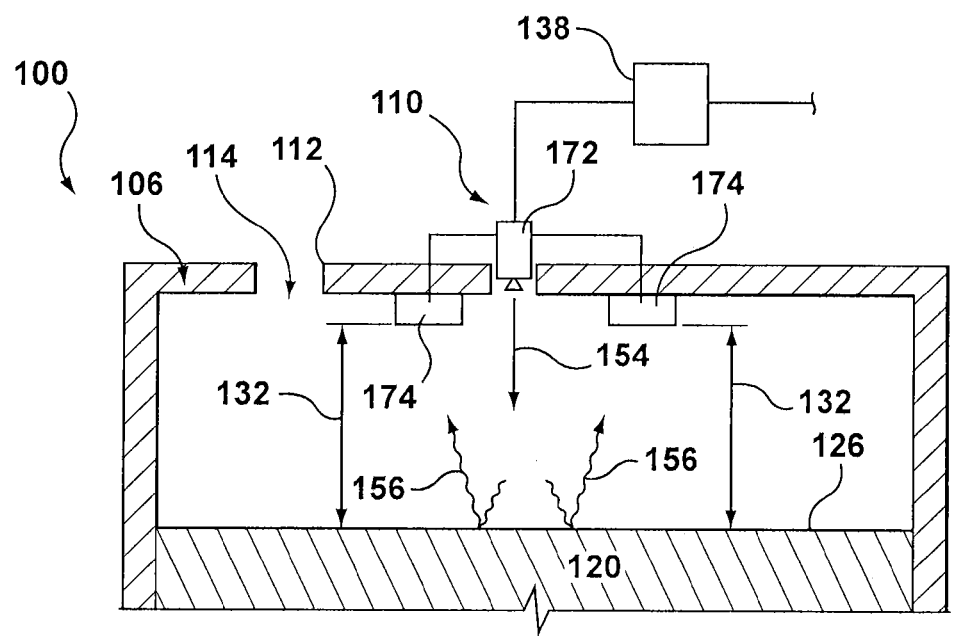
FIG. 7 is a schematic representation of an example of a metallurgical furnace.
Figure 8:
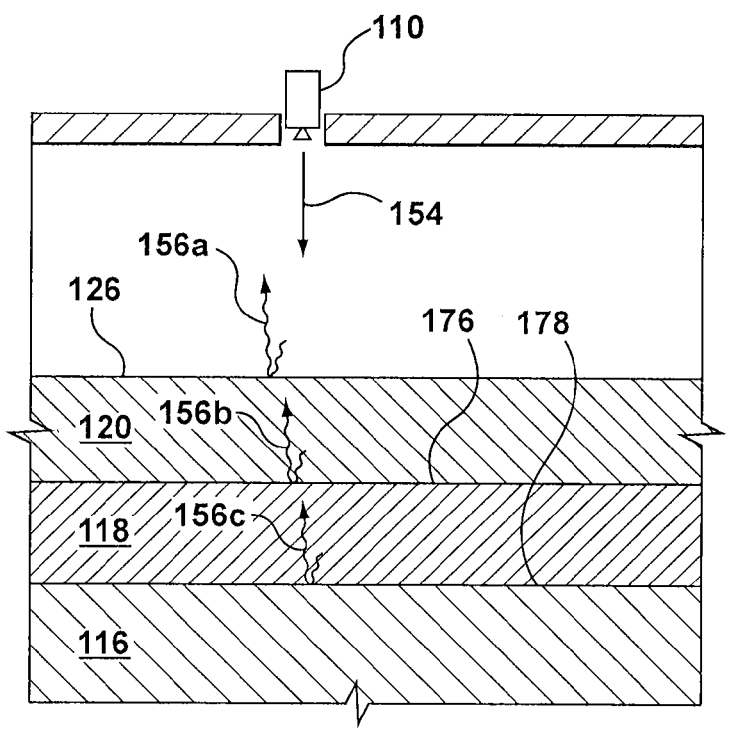
FIG. 8 is a schematic representation of an example of a metallurgical furnace.

Referring to FIG. 7, in some examples each sensor 110 can include separate transmitter and receiver components. The transmitter components can be any suitable transmitter or antenna, including horn, parabolic, rod and other types of antennas.

As exemplified, the sensor 110 includes a transmitter 172 and a pair of space apart receivers 174. In this configuration, the outgoing EM signal 154 from the transmitter 172 can produce a plurality of reflected EM signals 156, and each receiver 174 can receive a different reflected signal 156, which enables each receiver 174 to sense a different distance 132. Optionally, the transmitter 172 can be movable and can emit a series of pluses or outgoing signals 154 in order to produce a desired number of reflected signals 156.

The transmitter 172 and receivers 174 are communicably linked to each other and to the process controller 138.

In any of the examples described herein, the transmitters (and optionally receivers), for example transmitter 172 or the transmitter portion of integrated sensors 110, can include antenna array and any other suitable components, including wave guides, filters and signal processors.

In some examples, the sensor 110 can be configured to measure the distance to multiple surfaces or layers defined in the material in the furnace 100. As exemplified in FIG. 8, the sensor 110 can be configured to emit an outgoing EM signal 154 that is specifically calibrated or modulated to produce predictable, partial reflections 156*a-c* as the EM signal passes through multiple layers of material. In the illustrated example a first reflection 156*a* is created when the EM signal 154 contacts the upper surface 126 of the charge bank 120. This reflection 156*a* can be used by the sensor 110 and/or process controller to determine the charge bank height.

A second partial reflection 156*b* is created when the EM signal 154 contacts the upper surface 176 of the slag layer 118, defined at the interface between the charge bank 120 and the slag layer 118. The second partial reflection 156b can be used to calculate the level of the interface 176 (relative to the sensor 110 or a reference point) and to calculate the thickness of the charge bank 120.

A third partial reflection 156c is created when the EM signal 154 contacts the interface 178 between the slag layer 118 and the matte layer 116. The third partial reflection 156c can be used to calculate the level of the interface 178 (relative to the sensor 110 or a reference point) and to calculate the thickness of the slag layer 118.

The sensor 110 can include multiple receivers to collect the partial reflections 156a-c, or a single receiver that is configured to collect and decipher each reflection 156a-c. The partial reflections 156a-c can be isolated based on a number of factors including frequency and attenuation using known methods.

In any of the examples described herein, the compiled information from any plurality of sensors 100, optionally in combination with inputs from other furnace instrumentation, can be used to create a surface topography map or profile (i.e. a graphical representation of the shape of the upper surface 126) which can then be compared to one or more preferred or desired surface topography stored in a database, memory or other suitable system component.

Figure 5:
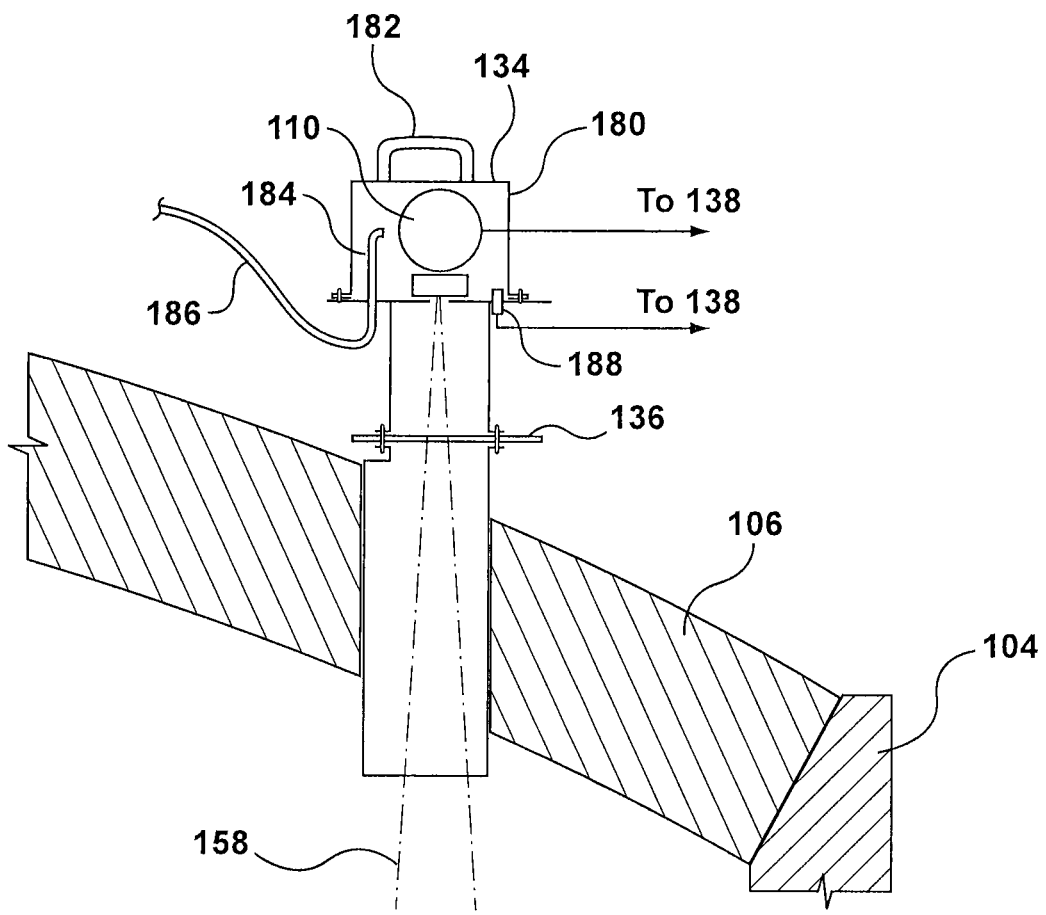
FIG. 5 is a partial section view of a portion of a roof of a metallurgical furnace with a sensor mounted to the roof.

Optionally, as exemplified in FIGS. 1, 2 and 5, the sensor 110 can be encased in a housing 134 that can optionally protect the sensor 110 from dirt, dust, ash and other particulate contamination as well as provide a desired degree of thermal and electromagnetic shielding. The housing 134 can be provided with additional utilities and monitoring equipment to protect and monitor the sensor 110. For example, the interior of the housing 134 can be flushed with a cooling gas, for example air, via nozzle 184 that is connected with hose 186 to a gas supply system (not shown). Flushing filtered cooling gas into the housing 134 can help cool the sensor 110 and can reduce the accumulation of dust and other debris within the housing 134. Optionally, the housing 134 can be configured to withstand the expected pressure loads that can be exerted on the housing 134 during normal operation of the furnace 100 (for example when the reactor vessel 108 is operated under slight vacuum conditions, or when relatively high pressure gases are emitted from the material in the furnace).

The housing 134 can also be equipped with any suitable temperature sensor 188 (for example a thermocouple or RTD) to allow for remote monitoring of the internal temperature of the housing 134. Optionally, information from the temperature sensor 188 can be provided to the process controller 138.

In some furnaces 100, for example electric-arc furnaces, the sensor 110 mounted to the reactor vessel 108 can be exposed to high levels of electromagnetic energy or signals that can interfere with the operation of the sensor and its associated electronic components. In such examples, as exemplified in FIG. 5, the housing 134 can include electromagnetic shielding components, including for example a Faraday shield or Faraday cage 180, to attenuate the magnitude of the electromagnetic signals that reach the sensor 110. Optionally, such electromagnetic shielding can be configured to filter or screen electromagnetic signals in a first or selected spectrum, while allowing electromagnetic signals in a second spectrum to pass relatively uninhibited through the housing 134.

Alternatively or in addition, the housing 134 can include one or more thermal radiation shielding elements to protect the sensor 110 from thermal radiation emitted by the material contained in the reactor vessel 108. Optionally, the thermal radiation shielding elements can be positioned between the sensor 110 and the upper surface of the 126 of the charge bank 120. In such examples, the thermal radiation shield can be formed from a material that provides a desired level of thermal isolation while still allowing the desired operation of the sensor (i.e. the thermal radiation shielding is substantially transparent to the sensor 110 so that it does not interfere with the operation of the sensor 110). The radiation shield can be any suitable material, including refractory cloth. In the illustrated examples, the thermal radiation shield is provided as a removable cassette containing refractory cloth 136.

Providing the refractory cloth 136 as a removable cassette allows for the refractory cloth 136 to be removed for inspection, repair and maintenance and then re-inserted to provide the desired shielding. The use of removable cassettes can also enable a user to replace or substitute the refractory cloth 136 shield with a different material to accommodate different sensors 110 and different furnace operating conditions. In other examples, the radiation shield may be integrally formed with the sensor 110, or provided as a fixed component attached to the housing 134, reactor vessel 108 or any other suitable support.

The housing 134 can be removable to allow inspection and maintenance of the sensor 110, and can include a handle 182 to enable removal of the housing 134.

It is understood that the furnace can be any suitable type of metallurgical furnace (including electric and non-electric furnaces) and the method of adding feed material into the furnace can be any suitable method, including for example, a continuous, semi-continuous or batch feeding regime.

While described as a radar sensor in the above examples, the sensor can be any suitable type of sensor, including, for example, a laser sensor, an automated sounding sensor (including digital image processing or optical sensing), an optical sensor, a Muon particle sensor, an acoustic sensor, a pulsed or frequency modulated electromagnetic sensor, an ultrasound sensor and a yo-yo sensor. Shielding materials and other control components can be selected based on the particular requirements of any given sensor.

While illustrated as simple schematic figures, it is understood that any furnace described herein can include any suitable features known in the art, including tap blocks, refractory linings and condition monitoring instruments, displays and control panels. The reactors can also include redundant control mechanisms allowing a human operator to override any of the automated features described above, either directly (manually controlling an actuator) or indirectly (using a supplemental or override control system).

Figure 9:
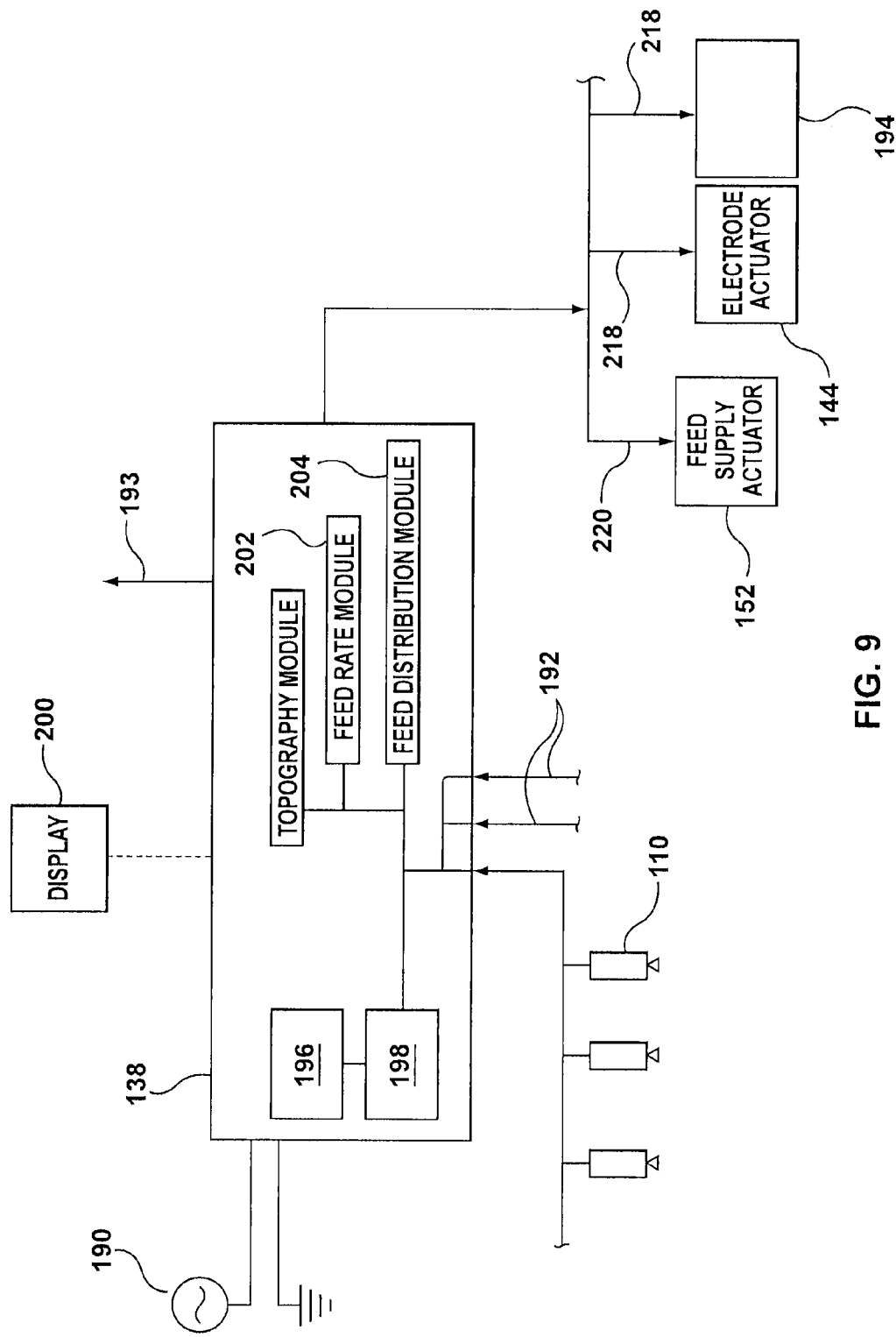
FIG. 9 is a diagram of a control system for a metallurgical furnace.
Figure 14:
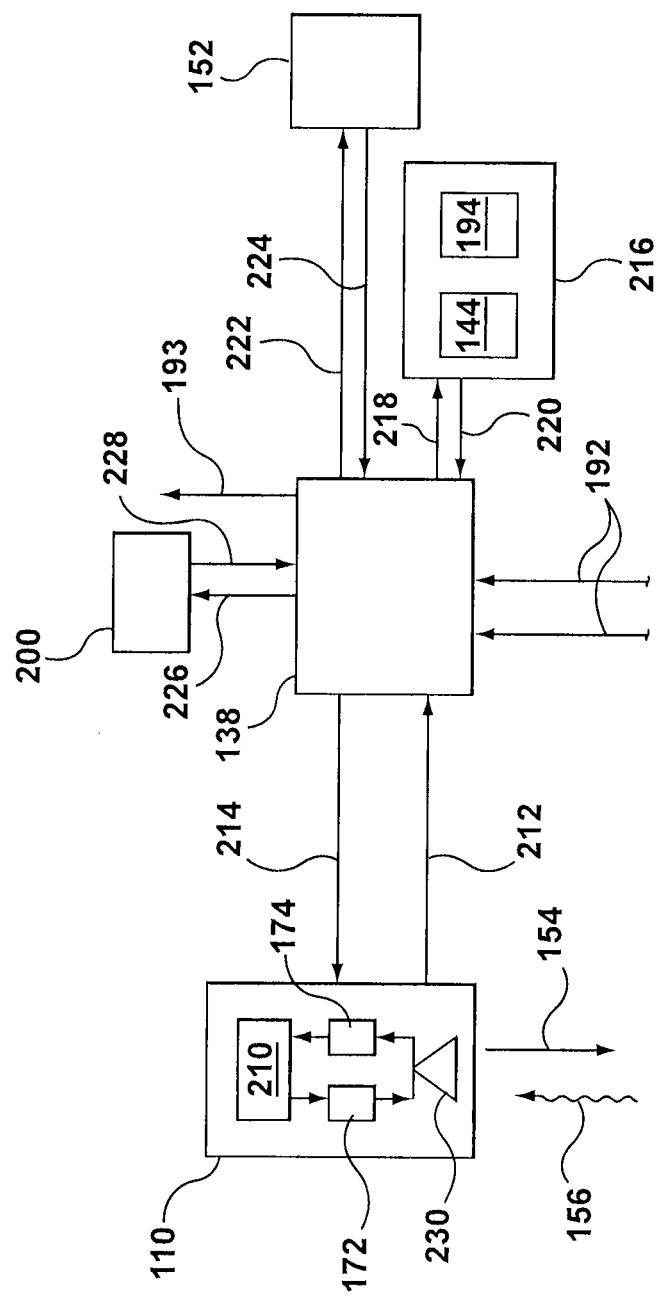
FIG. 14 is a diagram of another example of a control system for a metallurgical furnace.

Referring to FIGS. 9 and 14, an example of a system for monitoring the level of material contained within a metallurgical furnace includes a plurality of sensors 110 that are communicably linked to a central process controller 138. It is understood that each sensor 110 can also include its own sub-controllers for performing basic calculations and generating sensor output data, including, for example, sensed distances 132.

The process control 138 is also connected to a suitable power source 190 and can optionally be configured to receive any suitable number of additional or auxiliary input signals 192 from other furnace instruments and sensors (including RTD, thermocouples, pressure sensors and any other type of sensor), and to generate and output any suitable number of auxiliary control signals 193 for controlling other furnace equipment, instruments or processes.

When used in combination with the examples described above, the process controller 138 is configured to output feed control signals 222 to the gate actuators 152, for controlling the feed supply, and electrode control signals 218 to the electrode actuator 144, for controlling the movement of the electrode 142 and to the electrode power supply regulator 194 for controlling the electrode power, and any other suitable furnace control actuators.

The process controller 138 also includes a memory 196 for storing a database of predetermined values for a variety of furnace operation parameters against which measured values can be compared. For example, the memory 196 can include a stored range of acceptable or desired charge bank levels 128 for a given furnace 100 (having a known geometry), an overfill or maximum fill threshold value, other alarm condition thresholds (maximum temperature, minimum temperature, etc), a range of acceptable charge bank heights 121 and corresponding over fed or under fed alarm thresholds (optionally warning thresholds can be included as well). A specific set of pre-determined furnace operation parameters can be provided for every furnace (for example if the value depends on the geometry of the furnace) and for each type of product produced or feed material that is introduced into the furnace (each of which may have unique requirements).

As illustrated in FIG. 14, each sensor 110 can include an antenna 230 connected to a transmitter 172 for emitting electromagnetic signals 154, and a receiver 174 for receiving the reflected signals 156. Optionally, the sensor 110 can include a sensor sub-controller 210 for processing the signals 154, 156 to determine the distance between the sensor 110 and the object being sensed (distance 132 in the examples above). The sensor 110 is configured to produce a sensor output signal 212 which can include data relating the distance 132 measured by the sensor 110. In examples where the sensor 110 is positioned to measure the location of the upper surface 126 of the charge bank 120, the sensor output signal 212 can be called a level signal or a charge bank level signal.

In some examples, the sensor 110 is not remotely controllable, and the system may only include a one-way communication link between the sensor 110 and the process controller 138, e.g. for carrying the sensor output signal 212. In other examples, the process controller 138 can be configured to control the sensor 110, or some other related apparatus (for example the gimbal or inner support bracket). In such examples, the process controller 138 can be configured to output a sensor control signal 214 that can be sent to the sensor 110.

In some examples, the electrode actuator 144 and electrode power supply regulator 194 described above can be contained within a single electrode control unit 216. In this example the process controller 138 is configured to output an electrode control signal 218 that can be used to control the electrode actuator 144, electrode power supply regulator 194 or both. In operation, the process controller 138 can also receive information and data from the electrode control unit 216 via electrode output signal 220.

Similarly, the process controller 138 can be communicably linked to the feed gate actuator 150 (or any apparatus that is used to control the feed rate of feed material into the furnace) so that the process controller 138 can send a feed rate control signal 222 and receive a feed rate output signal 224. The feed rate output signal 224 can include any suitable data, including current feed rate and feed gate 150 position.

A display control signal 226 can be sent from the process controller 138 to the display 200 and can contain any suitable display data or information. Optionally, a display output signal 228 can be sent from the display 200 to the process controller 138 to convey information from a display 200 that includes an input device to the process controller 138 for further processing (for example touch screen inputs from an operator).

Optionally, the process controller can be configured to receive one or more auxiliary output signals 192 from a variety of different furnace sensors and apparatus. For example, if a given furnace includes a plurality of thermocouples or RTDs for sensing a plurality of temperatures in the furnace, the corresponding process controller 138 can be configured to receive a plurality of temperature output signals 192 and to use the temperature data received for further processing.

In addition to receiving auxiliary output signals 192 (output signals 192 are output signals from the various furnace instruments and sensors mentioned above and serve as inputs to the process controller 138), the process controller 138 can be configured to generate any other suitable auxiliary control signal 193 that can be used to provide process controller output data, or to control any suitable system or apparatus. The nature of the auxiliary control signals 193 can be pre-determined when the process controller 138 is manufactured and installed, or the process controller 138 can be reconfigurable by an operator to provide different auxiliary control signals 193 based on the changing operating conditions of the furnace.

The process controller 138 also includes a processor 198 that can be configured using a suitable method, algorithm or software package to analyze the measured data.

Figure 11:
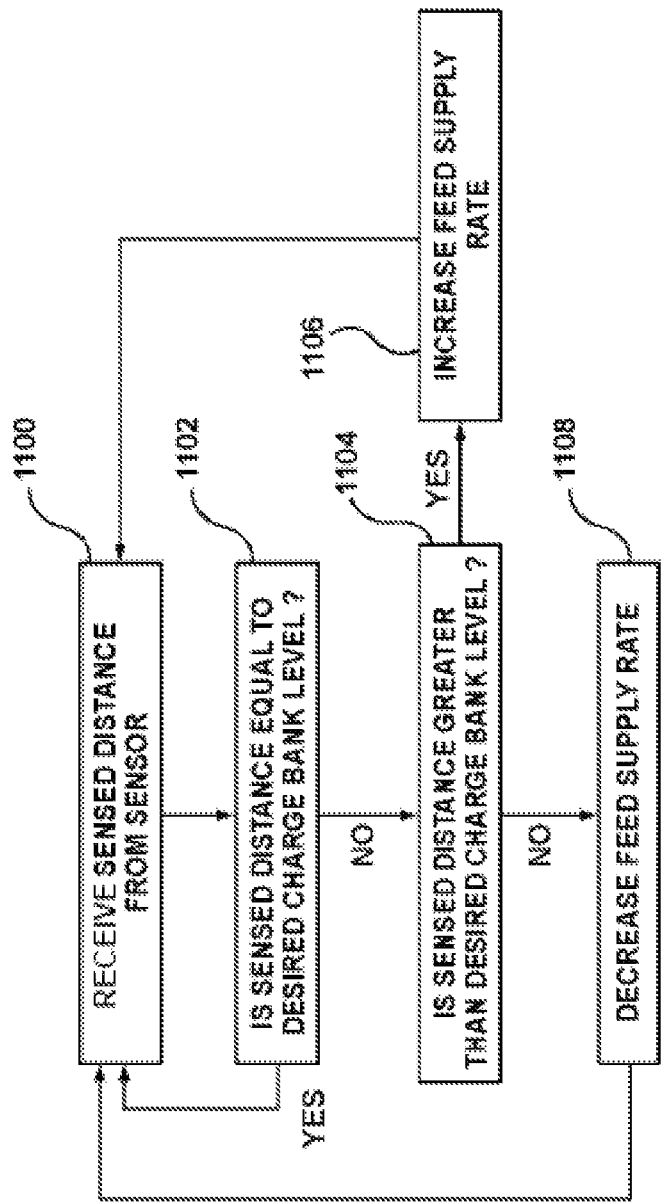
FIG. 11 is a flow chart illustrating an example of a method of operating a control system for a metallurgical furnace.

Referring to FIG. 11, one example of a method begins at step 1100 with process controller 138 receiving at least one sensed distance from a sensor 110. The sensed distance data can be accompanied by a plurality of other information that can be understood and processed by the process controller 138, including, for example, location information for the sensor, time stamp information, raw outgoing EM signal data, and raw reflected EM signal data.

Having received the sensed distance from the sensor, at step 1102 the processor 198, or any other suitable component of the process controller 138, can receive the sensed distance 132 and derive a charge bank level 128 and compare against the calculated range of acceptable charge bank levels 128 for the given reactor 100.

If the measured distance 132 is equal to an acceptable value, or falls within an acceptable range of values, the reactor 100 can be allowed to continue to operate without intervention, and the distance can be measured again by repeating step 1100 at any desired sampling rate (i.e. once a second, once a minute, etc.).

If the derived charge bank level 128 is not equal to the desired charge bank level 128, the processor 198 can determine if the measured height is greater than the acceptable levels, at step 1104. If the measured distance is greater than an acceptable level, the process controller 138 can generate a control signal, for example an under fed control signal at step 1106, that is sent to the feed supply actuator, for example gate actuator 152, causing the gate actuator 152 to increase the supply of feed material into the furnace.

If the measured distance is less than the acceptable level, the process controller 138 can output a control signal at step 1108, for example an over fed control signal, that is sent to the feed supply actuator, for example gate actuator 152, causing the gate actuator 152 to decrease the supply of feed material into the furnace. The nature and magnitude of appropriate changes to the feed material supply rate can be stored in, or calculated by, the feed rate module 202 and feed distribution module 204.

The feed rate module 202 can provide instructions to the processor regarding how much the feed supply rate should be changed, and the feed distribution module 204 can provide instructions regarding how the feed material should be distributed within the furnace 100.

For example, a process controller 138 connected to multiple sensors 110 may determine that, in a given furnace, the charge bank level in a first portion of the furnace is acceptable, the charge bank level in a second portion of the furnace is too high and the charge bank level in a third portion of the furnace is too low. Based on these inputs, the process controller 138 may individually controller three different gate actuators 152, based on instructions from the feed rate module 202 and feed distribution module 204, to maintain the current feed rate in the first portion, decrease the feed rate of the feed gate supplying the second portion and increase the feed rate of the feed gate supplying the third portion.

After completing either step 1106 or 1108, the method returns to step 1100, which can be conducted at any desired sampling rate (as described above).

Alternatively, or in addition to controlling the supply of feed material into the furnace 100, control signals from the process controller 138 can be used to adjust the electrode position or electrode power.

Figure 12:
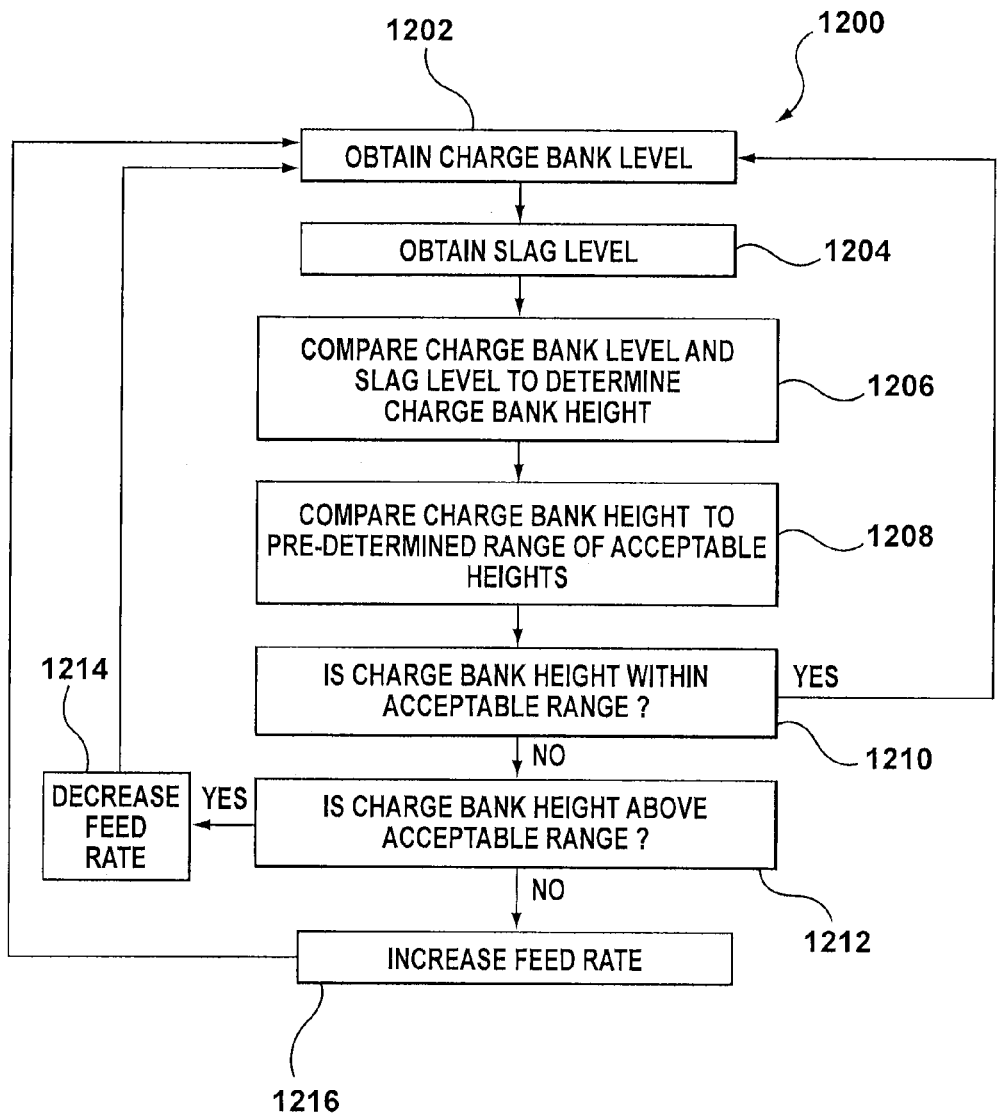
FIG. 12 is a flow chart illustrating another example of a method of operating a control system for a metallurgical furnace.

Referring to FIGS. 1 and 12, another example of a control method 1200 can be a feed control system and can begin at step 1202 when the process controller 138 obtains a charge bank level 128 from sensors 110 and continues to step 1204 in which the process controller 138 also receives data relating to the slag level 125.

At step 1206 the process controller 138 compares the charge bank level 128 to the slag level 125 to obtain the charge bank height 121, which, in the examples illustrated, is the difference between the two levels 125, 128.

Having calculated the charge bank height 121, the process controller 138 can advance to step 1208, in which the calculated charge bank height 121 is compared to one or more pre-determined desirable charge bank height values, or optionally a range of pre-determined desirable values, that are stored in the memory, or stored in a remote storage unit and retrieved by the processor.

Based on the comparison between the calculated charge bank height 121 and the plurality of pre-determined desirable heights, at step 1210 the process controller 138 determines if the calculated charge bank height 121 is acceptable, or is within an acceptable range.

If so, the process controller 138 need not take any immediate action or generate control signals, and the method 1200 can return to 1202 to obtain another charge bank level and continue the monitoring process.

If the charge bank height 121 is not acceptable or is not within an acceptable range, the method 1200 continues to step 1212, at which the process controller 138 determines if the calculated charge bank height 121 is too large (i.e. greater than the desired values stored in the memory). If so, the method 1200 advances to step 1214 in which the process controller 138 generates a feed control signal and causes the rate at which feed material is being introduced into the furnace to be decreased, for example by controlling the gate actuators 152 to close the feed gates 150. Once the feed rate has been decreased, the method 1200 returns to step 1202 and continues monitoring the furnace.

If the process controller 138 determines, at step 1212, that the charge bank height is below the desirable range, then it can be inferred (or re-checked against the pre-determined values) that the charge bank height 121 is thinner than desired (or below the pre-determined desirable range). In this case, at step 1216, the process controller 138 can increase the feed rate, thereby increasing the amount of feed material that is introduced into the furnace. Once the feed rate has been increased, the method returns to step 1202 to continue monitoring.

Figure 13:
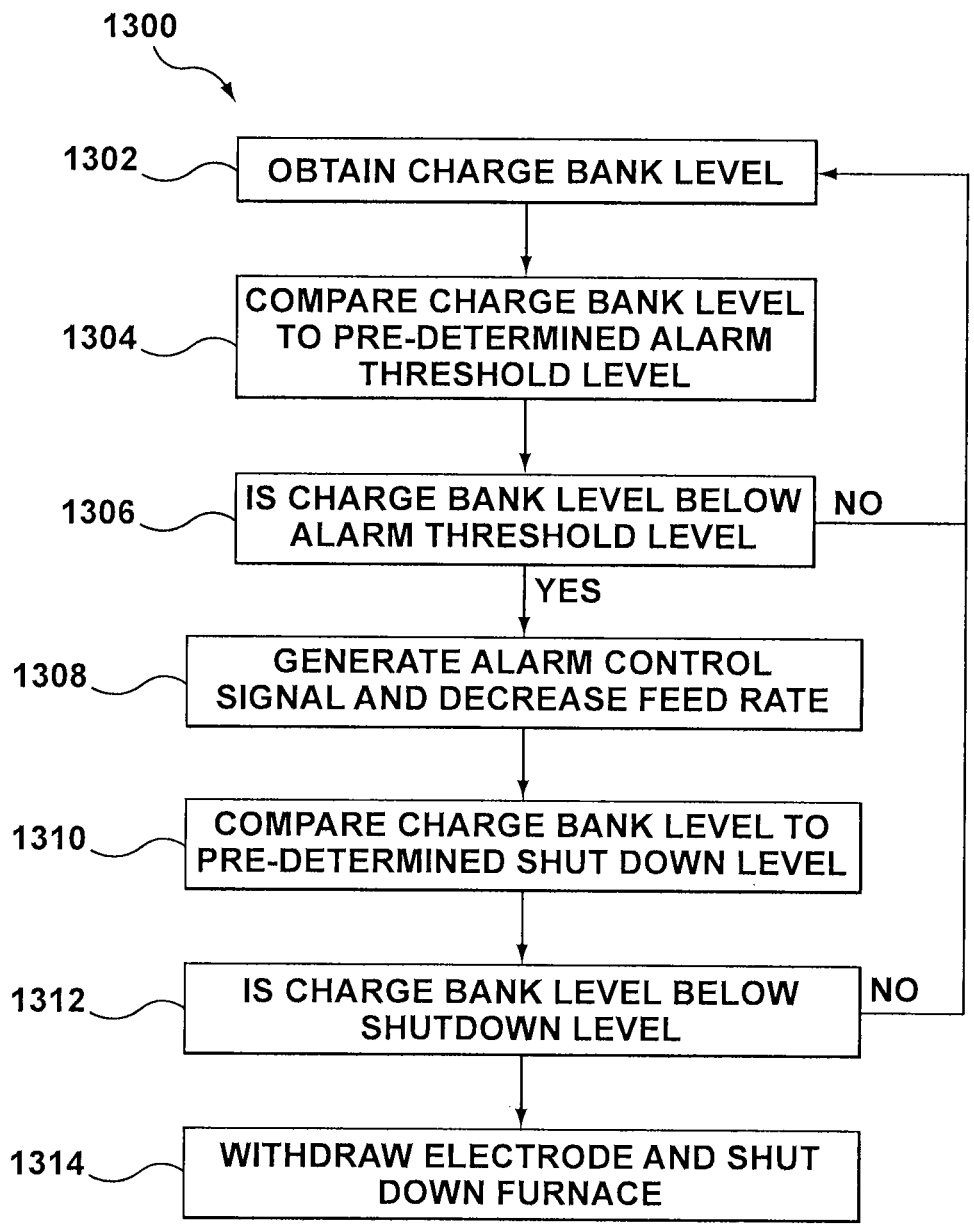
FIG. 13 is a flow chart illustrating another example of a method of operating a control system for a metallurgical furnace.

Referring to FIG. 13, another example of a control system 1300 can be an emergency stop or overfill monitoring system that begins at step 1302 when the process controller 138 obtains the charge bank level 128 from the sensors 110.

At step 1304, the measured charge bank level 128 is compared to one or more pre-determined warning and/or alarm and/or shutdown threshold values that are stored in the memory or other suitable location that can be accessed by the processor.

By comparing the calculated charge bank level 128 to the stored threshold values, the process controller 138 can determine if the charge bank level 128 is below a pre-determined alarm threshold. If not, the method 1300 returns to step 1302 and continues to monitor the charge bank level 128.

If the charge bank level 128 is below an alarm threshold value, the process controller 138 can generate an alarm output (for example a siren, buzzer, flashing light, or on-screen warning message) and optionally, can output additional control signals to control other furnace operating parameters including, for example, reducing the feed rate. The process controller 138 can be configured to automatically take control of the furnace operating parameters, and/or it can prompt human operators to take corrective action.

Method 1300 then continues to step 1310 in which the process controller determines if the charge bank level 128 exceeds a pre-determined shut down threshold (i.e. if the distance between the upper surface 126 and furnace roof 106 is below a safe or desired limit). If not, the method 1300 can return to step 1302. If so, the method advances to step 1314, in which the process controller 138 can output an emergency or shut down control signal that can automatically shut down the furnace or transfer control of the furnace 100 to the human operators.

In some examples, shutting down a furnace 100 is a complicated, multi-step process and it may be desirable that the process controller 138 not be configured to automatically shutdown the furnace without operator intervention. However, it may still be desirable that the process controller 138 be operable to perform certain operations (either automatically or after receiving operator input), including, for example, pulling up the electrode, stopping the supply of feed material in to the furnace and suggesting tapping the matte and/or slag from the furnace.

In these examples, the process controller 138 can operate as a closed-loop controller that is capable of automatically adjusting furnace operating parameters (i.e. feed supply rate, electrode position, electrode power supply, emergency shutdown systems) without operator intervention. Such a system enables the process controller 138 to automatically balance the power use and feed supply/distribution delivered to the furnace 100 to allow the furnace to operate continuously at a desired steady state condition, for example to continuously maintain the charge bank level within an acceptable range.

The process controller 138 can be a separate, self contained unit that can be connected to an existing furnace control system (possibly including a separate furnace controller). Alternatively the process controller 138 can be integral to the furnace control system and can serve as the primary, an optionally only, controller that is used to control the plurality of reactor operations described above.

Optionally, the process controller 138 can be connected to a display apparatus, for example display 200, that can be used to display a variety of data, including measured or sensed distances, feed supply rates and current charge bank levels, to a system operator in real-time. By watching the display 200, an operator can ascertain the operating conditions of a given furnace.

The display 200 can be any suitable display known in the art, including a computer monitor, a television display, a light source, an audible alarm or other audio/visual device.

In addition to calculating charge bank levels and adjusting feed supply rates accordingly, the process controller 138 can be configured to generate an alarm signal by comparing any of the measured data against a database of pre-determined alarm threshold conditions stored in the memory 196. When an alarm condition is detected (i.e. an alarm threshold is met or exceeded) the process controller 138 can generate an alarm output to notify a system operator, and/or automatically initiate an emergency protocol, including, for example, shutting down the furnace.

Figure 10:
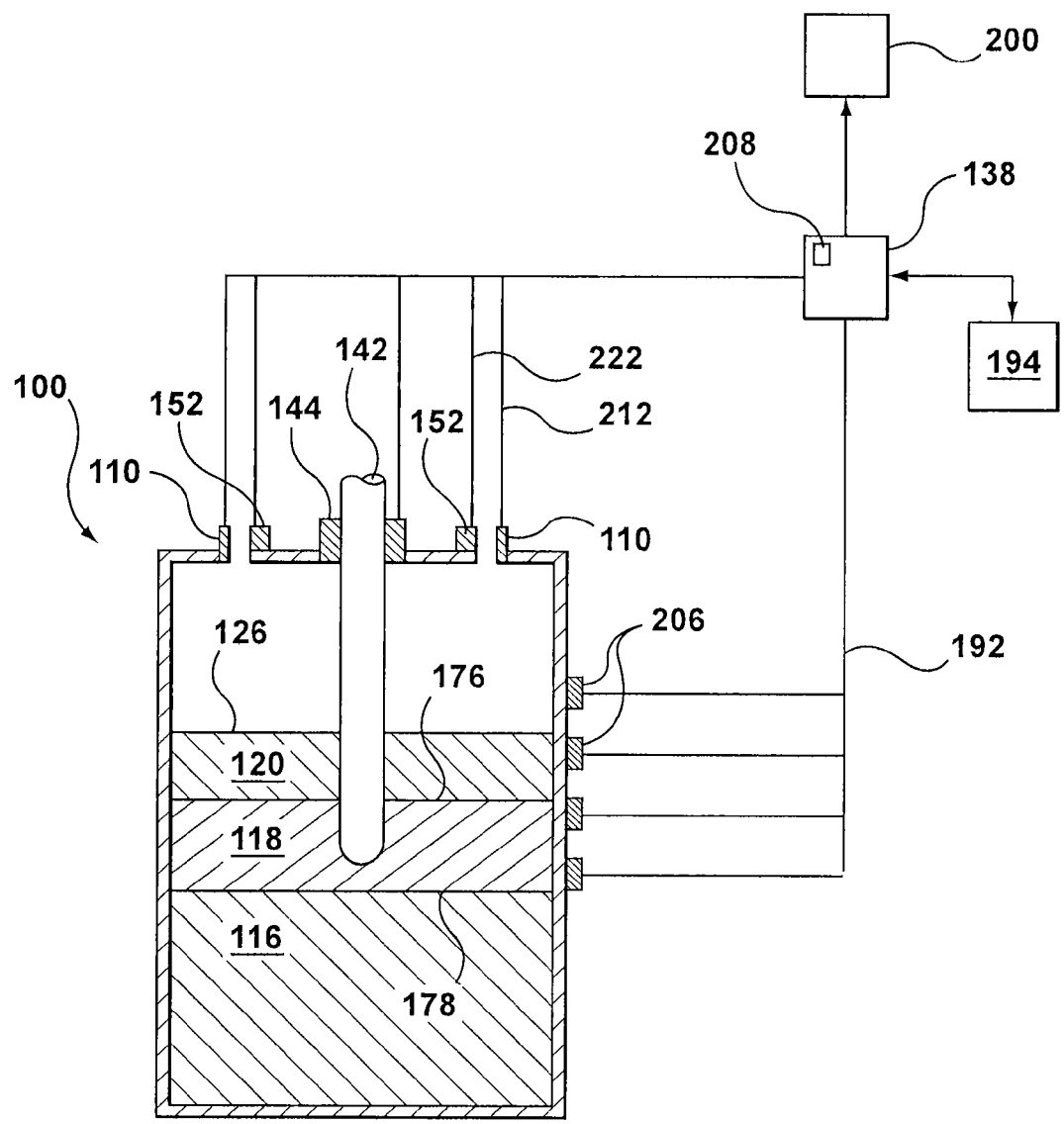
FIG. 10 is a schematic representation of an example of a metallurgical furnace and a control system for the furnace.

Referring to FIG. 10, an example of a furnace 100 includes a plurality of sensors 110, as described above, and a plurality of thermal sensors, for example remote temperature diodes (RTD) 206 that are positioned on the sidewall of the furnace 100 to sense temperature variations in the material in the furnace and to located the interface planes (surfaces) 176, 178, 126 based on the difference in temperature recorded by each RTD. In this example, the process controller 138 is linked to each RTD as well as each sensor 110. The process controller 138 can include any additional modules, for example an temperature measurement module 208, to process the data received from the RTDs 206 and extrapolate the locations of surfaces 176, 178, 126. This information can be combined with the charge bank level information and used to generate a suitable control signal that can be used to adjust the gate actuators 152, electrode actuator 144, electrode power supply regulator 194 and/or any other suitable furnace parameter.

Optionally, in some or all of the examples described herein, some or all of the material in the furnace (e.g. charge bank, slag phase and/or matte phase) can be seeded with detectable material to enhance the operation of the sensors. For example, in systems that use radar sensors, the material in the furnace can be seeded with particles of highly radar-reflective material to provide enhanced reflected signals. Optionally, only certain phases can be seeded, or each phase can be seeded with a different material to enhance the sensor's ability to distinguish between layers.

The present invention has been described here by way of example only. Various modification and variations may be made to these exemplary embodiments without departing from the spirit and scope of the invention.

We claim:

1. A system for monitoring a level of a feed material layer contained in a metallurgical furnace, the metallurgical furnace being an electric furnace, the system comprising:
   at least one non-contact sensor to sense a distance between an upper surface of the feed material layer and a reference position, the at least one sensor positioned above the feed material layer;
   a process controller communicably linked to the at least one non-contact sensor to output a control signal based on the sensed distance;
   a protective housing to protect each non-contact sensor;
   a thermal radiation shield positioned between each non-contact sensor and the feed material layer;
   a gas supply system to flush each protective housing with cooling gas; and
   at least one electrode in the metallurgical furnace having one or more operating parameters controllable based on the control signal, the at least one electrode being communicably linked to the process controller,
   wherein the non-contact sensor is electromagnetically insulated from electromagnetic interference present in the metallurgical furnace, and
   wherein the non-contact sensor is selected to penetrate the electromagnetic interference.

2. The system of claim 1, wherein the at least one non-contact sensor comprises:
   at least one transmitter positioned above the feed material and having an unobstructed line of sight to the feed material layer contained in the furnace, the at least one transmitter configured to project an electromagnetic signal toward the upper surface of feed material layer;
   at least one receiver positioned to receive a reflection of the electromagnetic signal from the upper surface of the feed material layer; and
   the non-contact sensor operable to determine the sensed distance,
   wherein characteristics of the electromagnetic signal are selected to penetrate the electromagnetic interference.

3. The system of claim 1, wherein at least one sensor is fixedly mounted relative to the furnace.

4. The system of claim 1, wherein the furnace comprises a plurality of feed ports and at least one sensor is positioned proximate to at least one of the plurality of feed ports.

5. The system of claim 1, wherein the furnace comprises a plurality of electrode ports and at least one sensor is positioned proximate to at least one of the plurality of electrode ports.

6. The system of claim 1, wherein the at least one sensor comprises a plurality of sensors each generating at least one corresponding sensed distance and the process controller is configured to generate the control signal based on a plurality of sensed distances.

7. The system of claim 6, wherein the process controller is configured to process the plurality of sensed distances to provide a surface topography of a surface of the feed material layer.

8. The system of claim 7, further comprising a display communicably linked to the controller to display at least one of any one of the plurality of sensed distances and the surface topography.

9. The system of claim 8, wherein the display is remote from the furnace.

10. The system of claim 6, wherein the process controller is configured to compare the surface topography to a pre-determined surface topography and to provide a surface output signal based on the comparison.

11. The system of claim 6, wherein the process controller is configured to output a plurality of control signals, each control signal being based on a corresponding one of the plurality of sensed distances.

12. The system of claim 1, wherein each sensor comprises a radar sensor.

13. The system of claim 1, wherein the thermal radiation shield includes refractory cloth.

14. The system of claim 1, wherein each protective housing comprises a Faraday cage to shield the non-contact sensor from the electromagnetic interference.

15. The system of claim 1, wherein the thermal radiation shield comprises a removable cassette containing refractory cloth.

16. The system of claim 15, wherein the thermal radiation shield is substantially transparent to the electromagnetic signal and the reflection.

17. The system of claim 1, wherein each sensor is positioned above a corresponding opening in a roof of the furnace, the opening providing the unobstructed line of sight to the feed material layer.

18. The system of claim 1, wherein the reference position is a known mounting location of the sensor.

19. The system of claim 1, wherein the controller is operable to generate the control signal in real-time.

20. The system of claim 1, wherein the process controller is communicably linked to a feed actuator and is configured to generate a feed control signal to automatically regulate a feed rate of the feed material based on feed control signal.

21. The system of claim 1, wherein the process controller is communicably linked to an electrode actuator and the control signal is configured to control the one or more operating parameters of the at least one electrode by automatically moving the electrode from a first position to a second position based on the control signal.

22. The system of claim 1, wherein the process controller is communicably linked to an electrode power supply regulator and the control signal is configured to control the one or more operating parameters of the at least one electrode by automatically regulating the power supplied to the electrode based on the control signal.

23. The system of claim 1, wherein the at least one sensor is moveably supported to enable the at least one sensor to sense a first sensed distance when the sensor is in a first position and to sense a second sensed distance when the sensor is in a second position.

24. The system of claim 1, wherein the at least one sensor is operable to sense a plurality of sensed distances corresponding to a plurality of locations on a surface of the feed material layer.

25. The system of claim 1, wherein the process controller is configured to receive and process data from at least one thermal sensor.

26. The system of claim 1, wherein the at least one sensor is positionable to sense a second sensed distance between a second material layer and the reference position.

27. The system of claim 1, wherein the at least one sensor comprises a first sensor positioned for sensing the sensed distance and a second sensor positioned to sense a second sensed distance between a second material layer and the reference position.

28. The system of claim 2, wherein the at least one receiver comprises at least two receivers and the at least one transmitter is communicably linked to each of the at least two receivers.

29. The system of claim 1, wherein the one or more operating parameters of the at least one electrode in the metallurgical furnace is a parameter selected from the group consisting of electrode position and electrode power supply.

30. The system of claim 1, wherein the non-contact sensor is selected from the group consisting of a laser sensor, an automated sounding sensor, an optical sensor, a Muon particle sensor, an acoustic sensor, a pulsed or frequency modulated electromagnetic sensor, an ultrasound sensor and a yo-yo sensor.

31. The system of claim 2, wherein the characteristics of the electromagnetic signal selected to penetrate the electromagnetic interference are selected from the group consisting of travel rate of the electromagnetic signal, frequency of the electromagnetic signal and magnitude of the electromagnetic signal.

32. A metallurgical furnace comprising:
a reactor vessel for containing a feed material layer;
at least one non-contact sensor mounted to the reactor vessel and positioned to have an unobstructed line of sight to the feed material layer contained in the furnace, the sensor operable to sense a sensed distance between an upper surface of the feed material layer and the sensor, the non-contact sensor being electromagnetically insulated from electromagnetic interference present between the non-contact sensor and the upper surface of the feed material layer, the non-contact sensor selected to penetrate the electromagnetic interference;
a protective housing to protect each non-contact sensor;
a thermal radiation shield positioned between each non-contact sensor and the feed material layer;
a gas supply system to flush each protective housing with cooling gas
a process controller communicably linked to the at least one sensor, the process controller operable to generate and output a control signal based on the sensed distance; and
at least one electrode having one or more operating parameters controllable based on the control signal, the at least one electrode being communicably linked to the process controller.

33. The furnace of claim 32, further comprising at least one feed port and at least one feed supply actuator to regulate a flow of feed material through the at least one feed port, the at least one feed supply actuator communicably linked to the process controller to automatically regulate a flow of feed material into the furnace based on the control signal.

34. The furnace of claim 32, wherein the at least one electrode is movably received within a corresponding electrode port and at least one electrode actuator operable to translate the at least one electrode relative to the reactor vessel, each electrode actuator communicably linked to the process controller to translate the at least one electrode based on the control signal.

35. A system for monitoring a level of a material layer contained in a metallurgical furnace comprising:
at least one non-contact sensor to sense a distance between an upper surface of the material layer and a reference position, the at least one sensor positioned above the material layer, the non-contact sensor being electromagnetically insulated from electromagnetic interference present between the non-contact sensor and the upper surface of the feed material layer, the non-contact sensor selected to penetrate the electromagnetic interference;
a protective housing to protect each non-contact sensor;
a thermal radiation shield positioned between each non-contact sensor and the feed material layer;
a gas supply system to flush each protective housing with cooling gas;
a process controller communicably linked to the at least one sensor to output a control signal based on the sensed distance; and
at least one electrode having one or more operating parameters controllable based on the control signal, the at least one electrode being communicably linked to the process controller.

* * * * *